US011327806B1

(12) United States Patent
Nagaraja et al.

(10) Patent No.: US 11,327,806 B1
(45) Date of Patent: May 10, 2022

(54) PROFILING AND APPLICATION MONITORING FOR EDGE DEVICES BASED ON HEADROOM

(71) Applicant: QPICLOUD TECHNOLOGIES PRIVATE LIMITED, Bangalore (IN)

(72) Inventors: Nagendra Nagaraja, Bangalore (IN); Abhinand Balachandran, Tamil Nadu (IN)

(73) Assignee: QPICLOUD TECHNOLOGIES PRIVATE LIMITED, Bangalore (IN)

( * ) Notice: Subject to any disclaimer, the term of this patent is extended or adjusted under 35 U.S.C. 154(b) by 55 days.

(21) Appl. No.: 17/116,384

(22) Filed: Dec. 9, 2020

(51) Int. Cl.
  *G06F 9/50* (2006.01)
  *G06N 3/08* (2006.01)
  *G06F 16/22* (2019.01)
  *G06F 8/61* (2018.01)
  *G06N 3/04* (2006.01)
  *G06F 3/0482* (2013.01)

(52) U.S. Cl.
  CPC ............. *G06F 9/505* (2013.01); *G06F 8/61* (2013.01); *G06F 16/22* (2019.01); *G06N 3/04* (2013.01); *G06N 3/08* (2013.01); *G06F 3/0482* (2013.01)

(58) Field of Classification Search
  CPC .................................................. G06F 9/5055
  See application file for complete search history.

(56) References Cited

U.S. PATENT DOCUMENTS

| 10,671,617 | B2 * | 6/2020 | Delattre | G06F 16/24578 |
| 2008/0095259 | A1 * | 4/2008 | Dyer | H04L 1/0631 |
| | | | | 375/265 |
| 2009/0281770 | A1 * | 11/2009 | Yatko | G06F 11/3476 |
| | | | | 702/186 |
| 2013/0166623 | A1 * | 6/2013 | Stanwood | H04W 4/00 |
| | | | | 709/202 |

OTHER PUBLICATIONS

Ali et al. "Clustering and Classification for Time Series Data in Visual Analytics: A Survey", IEEE Access, (2019), vol. 7, pp. 181314-181338.
Fawaz et al., "InceptionTime: Finding AlexNet for Time Series Classification", Data Mining and Knowledge Discovery, (2020), vol. 34.6, (27 pages).
Lillicrap et al. "Continuous Control With Deep Reinforcement Learning", ICLR, (2016), (14 pages).
Ozkoc, "Clustering of Time-Series Data", IntechOpen, (2019), (19 pages).

* cited by examiner

*Primary Examiner* — Jae U Jeon
(74) *Attorney, Agent, or Firm* — Foley & Lardner LLP

(57) ABSTRACT

A system and method include receiving a resource headroom data of an edge device, receiving resource utilization data of a plurality of applications, and selecting a group of applications from the plurality of applications for installation on the edge device based upon the resource headroom of the edge device. The system and method also include computing a fitness score based upon a suitability of the selected group of applications for the edge device, generating a reward based on the fitness score, and using the reward to refine the selection of the group of selections in subsequent iterations.

20 Claims, 14 Drawing Sheets

US 11,327,806 B1

PROFILING AND APPLICATION MONITORING FOR EDGE DEVICES BASED ON HEADROOM

BACKGROUND

The following description is provided to assist the understanding of the reader. None of the information provided or references cited is admitted to be prior art.

Many applications use one or more computing devices to perform various operations. These computing devices may have one or more applications installed thereon. The one or more applications may be allocated resources such as compute power, memory, network bandwidth, etc. to perform the various operations. In some instances, a new application may need to be installed on one or more of the computing devices. However, current mechanisms of deciding which of the computing device(s) to install the new application on are limited in the way they are configured and how they operate.

SUMMARY

In accordance with some aspects of the present disclosure, a method is disclosed. The method includes receiving, by a processor executing computer-readable instructions stored on a memory, a resource headroom data of an edge device; receiving, by the processor, resource utilization data of a plurality of applications; and selecting, by the processor, a group of applications from the plurality of applications for installation on the edge device based upon the resource headroom of the edge device. The method also includes computing, by the processor, a fitness score based upon a suitability of the selected group of applications for the edge device; generating, by the processor, a reward based on the fitness score; and using, by the processor, the reward to refine the selection of the group of selections in subsequent iterations.

In accordance with some other aspects of the present disclosure, a system is disclosed. The system includes a memory having computer-readable instructions stored thereon and a processor that executes the computer-readable instructions to receive a resource headroom data of an edge device; receive resource utilization data of a plurality of applications; and select a group of applications from the plurality of applications for installation on the edge device based upon the resource headroom of the edge device. The processor also executes the computer-readable instructions to compute a fitness score based upon a suitability of the selected group of applications for the edge device; generate a reward based on the fitness score; and use the reward to refine the selection of the group of selections in subsequent iterations.

In accordance with some other aspects of the present disclosure, a non-transitory computer-readable media having computer-readable instructions stored thereon is disclosed. The computer-readable instructions when executed by a processor cause the processor to perform a process including receiving a resource headroom data of an edge device, receiving resource utilization data of a plurality of applications, and selecting a group of applications from the plurality of applications for installation on the edge device based upon the resource headroom of the edge device. The computer-readable instructions when executed by a processor also cause the processor to perform a process including computing a fitness score based upon a suitability of the selected group of applications for the edge device, generating a reward based on the fitness score, and using the reward to refine the selection of the group of selections in subsequent iterations.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
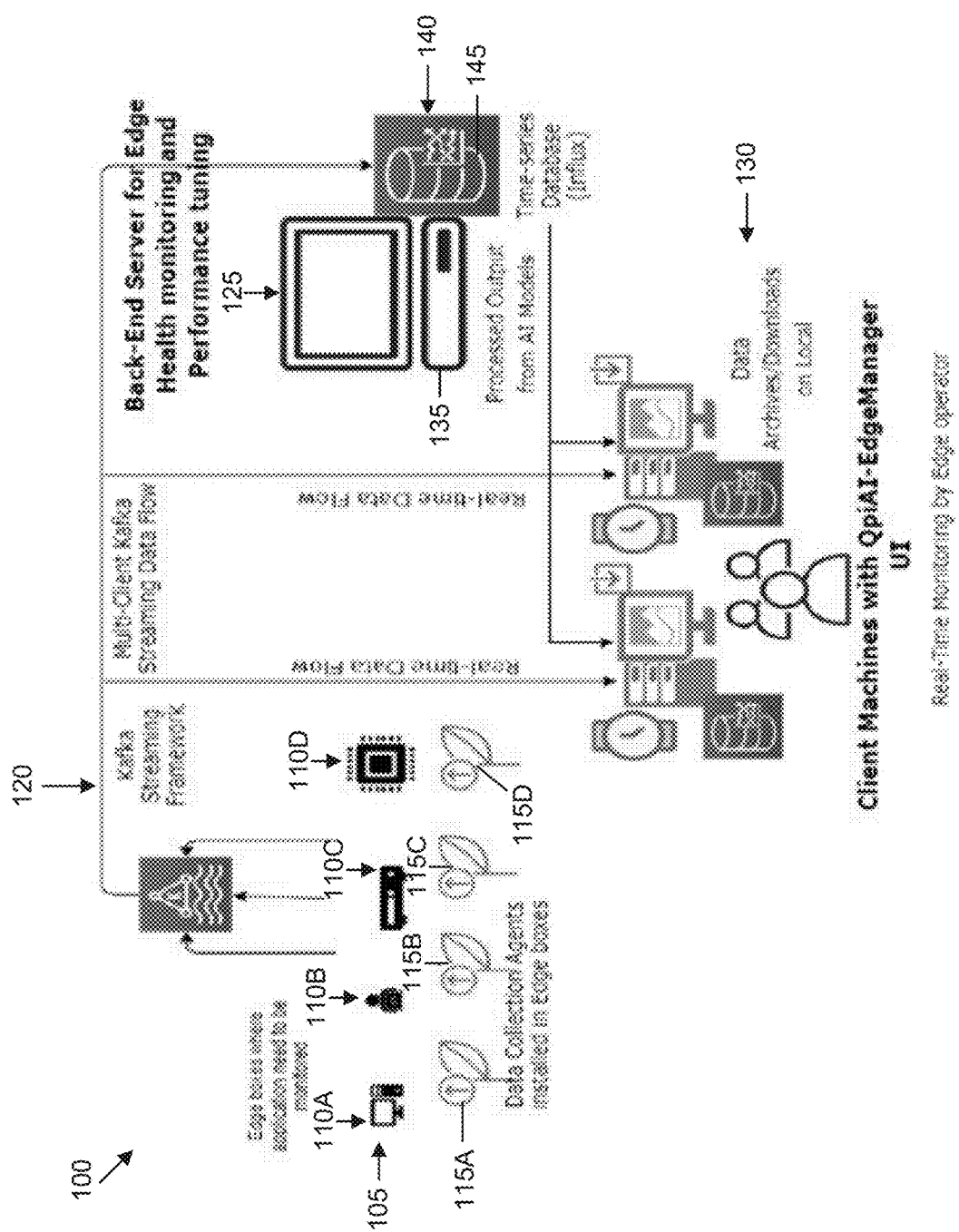
FIG. 1 is an example block diagram of an application profiling system, in accordance with some embodiments of the present disclosure.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring to FIG. 1, an example application profiling system 100 is shown, in accordance with some embodiments of the present disclosure. The application profiling system 100 may be used for real time monitoring of a plurality of devices. Thus, the application profiling system 100 includes a plurality of edge devices 105, including for example, edge devices 110A, 110B, 110C, and 110D that are being monitored. Edge devices are also referred to herein as "edge boxes." Although four edge devices (e.g., the edge devices 110A-110D) are shown herein, in other embodiments, greater than or fewer than four edge devices may be provided in the application profiling system 100. Each of the plurality of edge devices 105 may be a device, apparatus, machine, or system associated with a computing device. For example, in some embodiments, at least one of the plurality of edge devices 105 may be a printed circuit board based controller having a processing unit, memory, and an operating system. In some embodiments, at least one of the plurality of edge devices 105 may be a component on a factory floor. For example, in some embodiments, at least one of the plurality of edge devices 105 may be a heat exchanger, sensing device, machinery, robot, or any other device or component that is associated with or otherwise connected to a computing device (e.g., a controller, processing unit, memory, operating system).

Further, each of the plurality of edge devices 105 may be associated with an agent. For example, the edge device 110A may be associated with (e.g., have installed thereon) an agent 115A, the edge device 110B may be associated with (e.g., have installed thereon) an agent 115B, the edge device 110C may be associated with (e.g., have installed thereon) an agent 115C, and the edge device 110D may be associated with (e.g., have installed thereon) an agent 115D. The agents 115A-115D are collectively referred to herein as the agents 115. Each of the agents 115 may be an autonomous software program that is configured for performing one or more specific and approved operations. In some embodiments, the agents 115 may also be associated with hardware, firmware, or a combination thereof for performing the one or more specific and approved operations. For example, in some embodiments, the agents 115 may be associated with resources (e.g., CPU, memory, etc.) that enable those agents to operate as intended. In some embodiments, the agents 115 may be installed on a particular one of the plurality of edge devices 105 for performing the one or more specific and approved operations. In other embodiments, the agents 115 may be installed on another device and operatively connected to a particular one of the plurality of edge devices for performing the one or more specific and approved operations.

In some embodiments, the agents 115 may be data collection agents configured to collect data from its associated edge device. In some embodiments, the agents 115 may have a process running thereon that may regularly (e.g., every 10 seconds) poll the associated one of the plurality of edge devices 105 to collect the data. In some embodiments, the agents 115 may poll the plurality of edge devices 105 by calling an Application Programming Interface (API). In other embodiments, the agents 115 may use other mechanisms to poll the plurality of edge devices 105. Also, in other embodiments, the agents 115 may use mechanisms other than, or in addition to, polling to collect data from the plurality of edge devices 105. Further, in some embodiments, the agents 115 may collect resource utilization data from the plurality of edge devices 105. Resource utilization data may include CPU (Central Processing Unit) utilization data, memory capacity data, network bandwidth data, field programmable gate array (FPGA) data for programming new logic, temperature, etc. In other embodiments, the agents 115 may be configured to gather other or additional types of resource utilization data. The agents 115 may also be configured to gather data other than or in addition to resource utilization data. For example, in some embodiments, the agents 115 may be configured to gather system level metrics and application level metrics, data related to application discovery and profiling (e.g., determining which applications are installed on the respective edge box), etc.

In some embodiments, each of the agents 115 may be configured to gather multiple types of resource utilization data. In other embodiments, each of the agents 115 may be configured to gather a single type of resource utilization data. Thus, in some embodiments, each of the plurality of edge devices 105 may be associated with multiple agents, depending upon the type of resource utilization data that is to be gathered. In some embodiments, one or more of the agents 115 may be configured to gather data from a single one of the plurality of edge devices 105. In other embodiments, one or more of the agents 115 may be configured to gather data from multiple ones of the plurality of edge devices 105. Thus, the agents 115 may be configured in a variety of ways to gather data (e.g., resource utilization data) from the plurality of edge devices 105. The agents 115 may be programmed with the type of resource utilization data that a particular agent has to collect, as well as the identity of the plurality of edge devices 105 whose resource utilization data that agent has to collect.

Further, in some embodiments, the agents 115 may also be configured to transfer the collected data to other entities. In some embodiments, the agents 115 may be configured to buffer the collected data and send the collected data in batches periodically. In other embodiments, the agents 115 may be configured to send data instantaneously (or substantially instantaneously) as the data is collected. In some embodiments, and particularly in those embodiments in which the agents 115 are buffering the data before transmission, the agents may be configured to receive a notification of successful transmission before deleting the buffered data. In other embodiments, the agents 115 may be configured to delete the buffered data upon sending the data without waiting for a successful transmission notification. Thus, the agents 115 may be configured to transmit data in a variety of ways.

Additionally, in some embodiments, the agents 115 may be configured to send raw data that is gathered from the plurality of edge devices 105. In other embodiments, the agents 115 may be configured to process the data before sending. For example, in some embodiments, the agents 115 may sort, filter, compress, and/or encrypt the data before sending. In other embodiments, the agents 115 may perform other processing operations on the data before sending the data. In some embodiments, the agents 115 may calculate a headroom and transmit the headroom data instead of, or in addition, to the raw data. Headroom is the difference between an amount of a resource allocated to an edge device and the amount of that resource being used by that edge device at a particular time instant. Thus, headroom may be considered to be the remaining amount of resource at a particular time instant at an edge device. For example, if the edge device 110A is allocated 10 Gigabytes of memory and that edge device is consuming 6 Gigabytes of memory at time, t, the headroom for memory on that edge device at time, t, is (10−6)=4 Gigabytes. Thus, at time, t, the edge device 110A has the ability to consume an additional 4 Gigabytes of memory. Headroom may be computed for each resource that is allocated to the plurality of edge devices 105 and/or whose data is collected by the agents 115. Thus, in some embodiments, for each of the plurality of edge devices 105, a plurality of headroom data—one for each type of resource, may be computed.

In some embodiments, the agents 115 may be configured to compute the headroom. In such embodiments, the agents 115 may be configured to know the amount of a particular resource that is allocated ("allocated amount") to the plurality of edge devices 105 whose resource utilization data a particular agent is configured to collect. Thus, upon collecting the actual resource utilization data ("actual amount") from a particular one of the plurality of edge devices 105, the agent (e.g., the agents 115) associated with that particular edge device may compute a difference between the allocated amount and the actual amount to determine the headroom for a particular resource. In other embodiments, another entity of the application profiling system 100 may be configured to compute the headroom.

Figure 2:
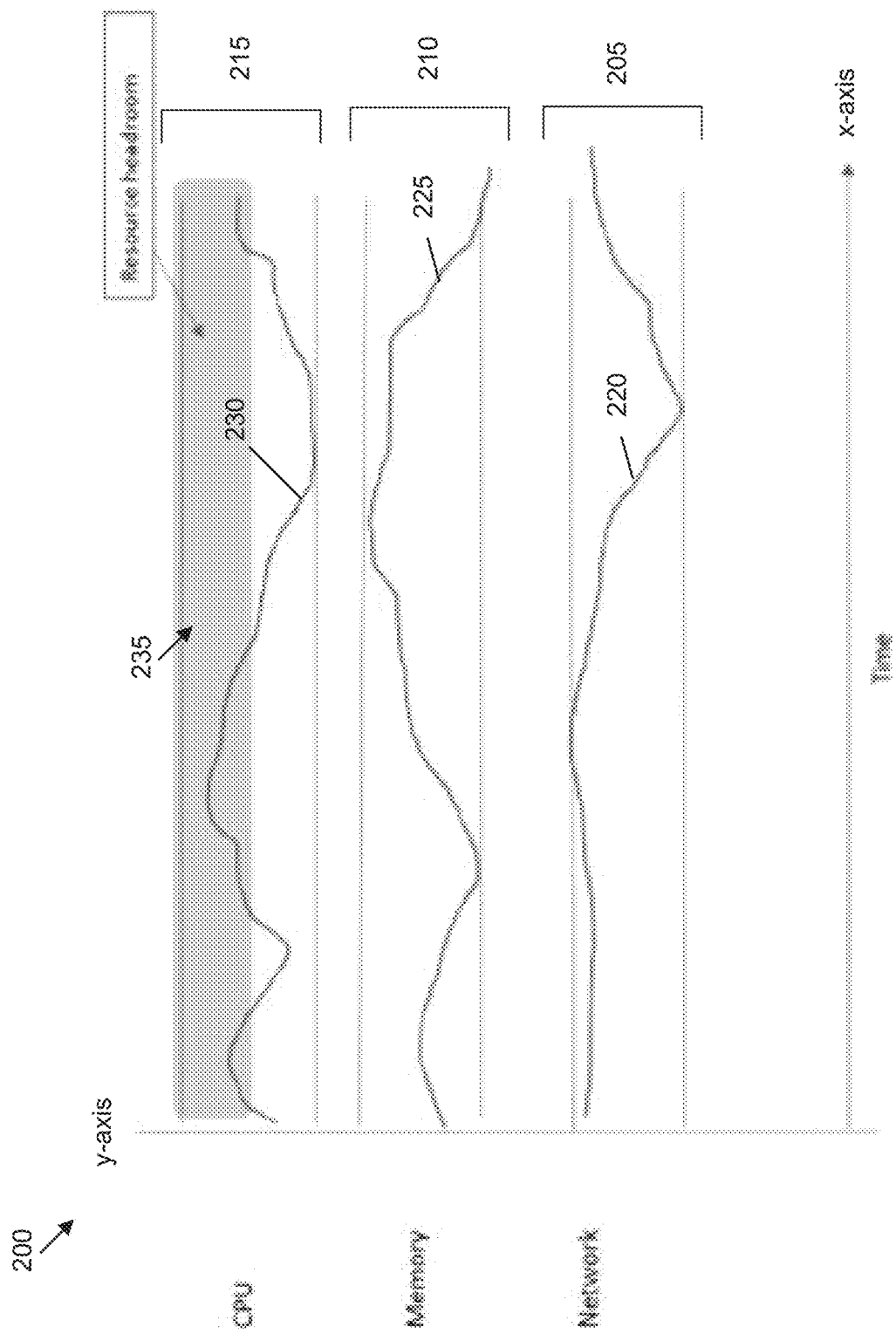
FIG. 2 is an example time-series of resource headroom of an edge device, in accordance with some embodiments of the present disclosure.

In addition to computing the headroom, in some embodiments, the agents 115 may create a time-series map of the actual resource utilization and the headroom. An example of a time-series map is shown in FIG. 2. In other embodiments, another entity of the application profiling system 100 may compute the time-series map. Thus, for each type of resource utilization, the agents 115 may transmit raw data, processed data, headroom data, and/or time-series data (collectively referred to herein as "transmitted data"). The agents 115 may utilize a streaming framework 120 to send the transmitted data. In some embodiments, the streaming framework 120 may include a network. For example, in some embodiments, the streaming framework 120 may include any of a variety of wired or wireless network channels that may be suitable for use within the application profiling system 100. For example, in some embodiments, the streaming framework 120 may include wired connections, such as an Ethernet connection, one or more twisted pair wires, coaxial cables, fiber optic cables, etc. In other embodiments, the streaming framework 120 may include wireless connections, such as microwaves, infrared waves, radio waves, Bluetooth, Z-Wave, spread spectrum technologies, satellites, etc. The streaming framework 120 may also be configured to communicate with other devices/systems within the application profiling system 100 using cellular networks, local area networks, wide area networks, the Internet, etc. In some embodiments, the streaming framework 120 may include a combination of wired and wireless communications. The streaming framework 120 may also include or be associated with network interfaces, switches, routers, network cards, and/or other hardware, software, and/or firmware components that may be needed or considered desirable to have in facilitating intercommunication within the application profiling 100.

Using the streaming framework 120, the agents 115 may transmit the data to a server 125 (also referred to herein as the back-end server 125) and one or more client machines 130. In other embodiments, the using the streaming framework 120, the agents 115 may transmit the data to other desired components of the application profiling system 100 as well. In some embodiments, the server 125 may be a hardware device such as server computers from Dell, Inc., Lenovo Group Ltd. or Lenovo PC International, Cisco Systems, Inc., etc. In other embodiments, the server 125 may include or be associated with another type of hardware device, such as a personal computer, an input/output or peripheral unit such as a printer, or any type of device that is suitable for performing the functions described herein.

The server 125 may be associated may include one or more processors 135 configured to execute instructions. The instructions may be carried out by a special purpose computer, logic circuits, or hardware circuits of the server 125. The processors 135 may be implemented in hardware, firmware, software, or any combination thereof. The term "execution" is, for example, the process of running an application or the carrying out of the operation called for by an instruction. The instructions may be written using one or more programming language, scripting language, assembly language, etc. The processors 135, thus, execute an instruction, meaning that they perform the operations called for by that instruction. The processors 135 may be operably coupled to a memory device 140 to receive, send, and process information, and to control the operations of the agents 115. The processors 135 may retrieve a set of instructions from the memory device 140, such as, from a permanent memory device like a read only memory ("ROM") device and copy the instructions in an executable form to a temporary memory device that is generally some form of random access memory ("RAM"). In some embodiments, the processors 135 may execute instructions without first copying the instructions to the RAM. Further, the processors 135 may include a single stand-alone processor, or a plurality of processors that use the same or different processing technology.

The memory device 140 may include a variety of types of storage devices that are suitable for the application profiling system 100. For example, in some embodiments, the memory device 140 may include, but is not limited to, any type of RAM, ROM, flash memory, magnetic storage devices (e.g., hard disk, floppy disk, magnetic strips, etc.), optical disks (e.g., compact disk ("CD"), digital versatile disk ("DVD"), etc.), smart cards, solid state devices, etc. In some embodiments, the memory device 140 may include any of a variety of network accessible storage that is suitable for use within the application profiling system 100 and accessible via the streaming framework 120. The memory device 140 may form a distributed storage system configured to be accessed by each of the plurality of edge devices 105 and the agents 115 via the streaming framework 120. In some embodiments, the memory device 140 may include cloud storage. The memory device 140 may be configured to store the transmitted data received from the agents 115. Thus, the memory device 140 may include one or more databases 145 that store the data received from the agents 115. The memory device 140 may also be configured to store one or more algorithms or computer-readable instructions that may be executed by the processors 135 to perform the functions described herein.

In some embodiments, the server 125 may be configured to determine the types and numbers of applications that may be installed on the plurality of edge devices 105 based upon the headroom data and the time-series map of resource utilization received from the agents 115. In some embodiments, the server 125 may implement a deep reinforcement learning algorithm to pick a group of applications that are most suitable for installation on the plurality of edge devices 105. Additional details of the server 125 are discussed below.

Figure 12:
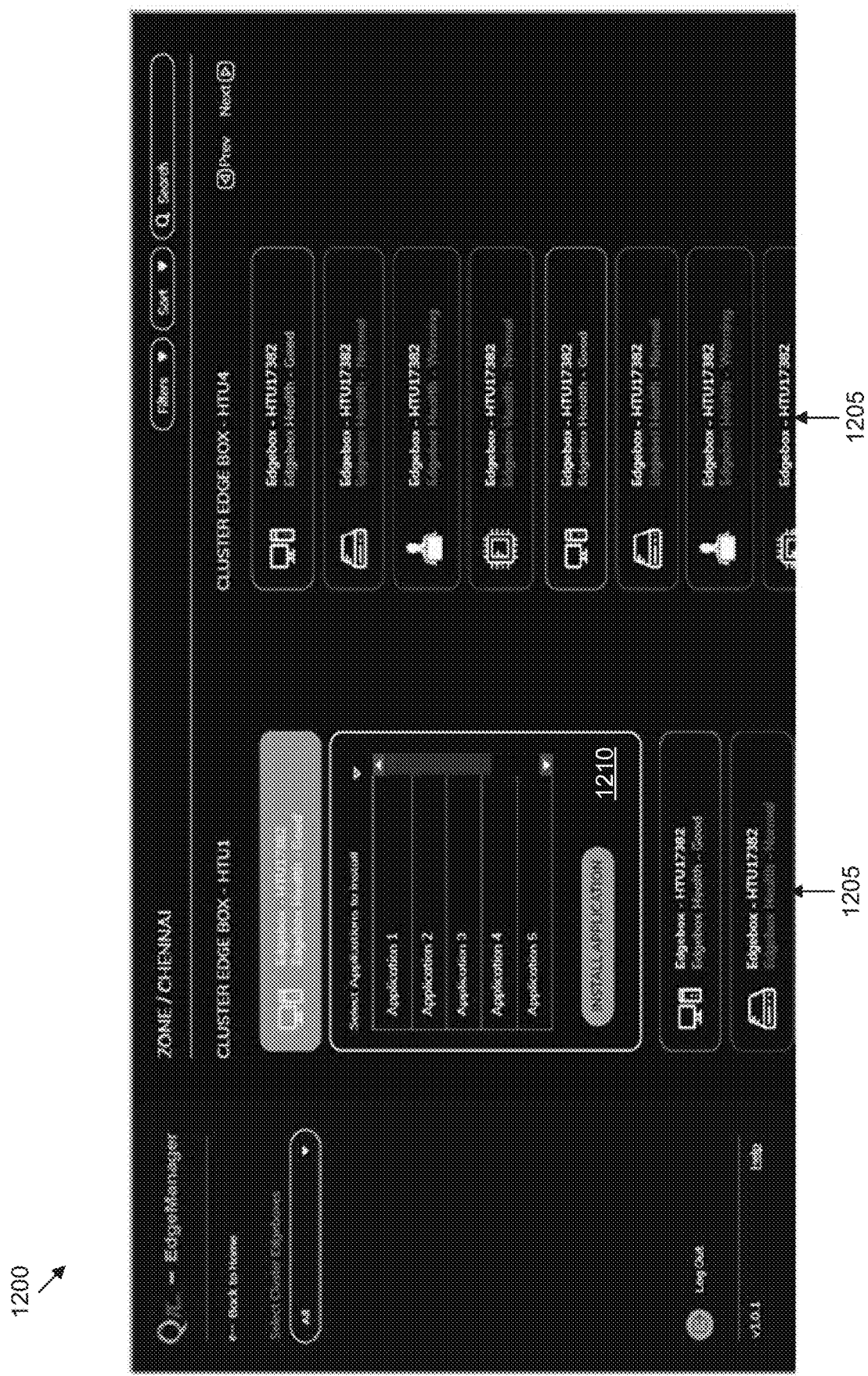
FIG. 12 is an example screenshot of a dashboard, in accordance with some embodiments of the present disclosure.

Referring still to FIG. 1, the agents 115 may also transmit the data to the one or more client machines 130. Each of the one or more client machines 130 may include a user interface (e.g., dashboard, an example of which is shown in FIG. 12 below) by which a user may pick an application based upon information received from the server 125 to install on one or more of the plurality of edge devices 105. Each of the one or more client machines 130 may also include a processor (e.g., similar to the processors 135) and a memory.

It is to be understood again that only certain components and features of the application profiling system 100 are shown and described herein. Nevertheless, other components and features that may be needed or desired to perform the functions described herein are contemplated and considered within the scope of the present disclosure. It is also to be understood that the configuration of the various components of the application profiling system 100 described above is only an example and is not intended to be limiting in any way. Rather, the configuration of those components may vary to perform the functions described herein.

Turning to FIG. 2, an example time series map 200 is shown, in accordance with some embodiments of the present disclosure. The time series map 200 plots time on X-axis against utilization of resources on Y-axis. Specifically, the time series map 200 plots resource utilization for network, memory, and CPU utilization on the same plot. Thus, the time series map 200 combines multiple resource utilizations on a single plot and may be referred to a multi time-series. In other embodiments, a separate time series map may be created for each of those resources. Further, although only network, memory, and CPU utilization are shown in the time series map 200, in other embodiments, resource utilization of other or additional resources may be similarly plotted. Each resource on the time series map 200 depicts an allocated amount of that resource, a consumed amount of that resource at a particular time, and the headroom.

For example, the time series map 200 shows that the network resource has an allocated network amount depicted by range 205, the memory resource has an allocated memory amount depicted by range 210, and CPU resource has an allocated CPU amount depicted by range 215. The actual resource utilization of the network, memory, and CPU resources is shown by plots 220, 225, and 230, respectively. Based on the allocated amount and the actual resource utilization, the headroom of a resource may be computed from the time series map 200. For example, the time series map 200 shows a resource headroom 235 of the CPU as the difference between an upper end of the range 215 and an average amount of actual resource utilization shown by the plot 230. Similarly, although not shown in the time series map 200, resource headroom may be computed for memory and network resources. This resource headroom information may be used by the server 125 to select a group of applications to be installed on a particular one of the plurality of edge devices 105. It is to be understood that the terms headroom, resource headroom, and the like are used interchangeably herein.

Figure 3:
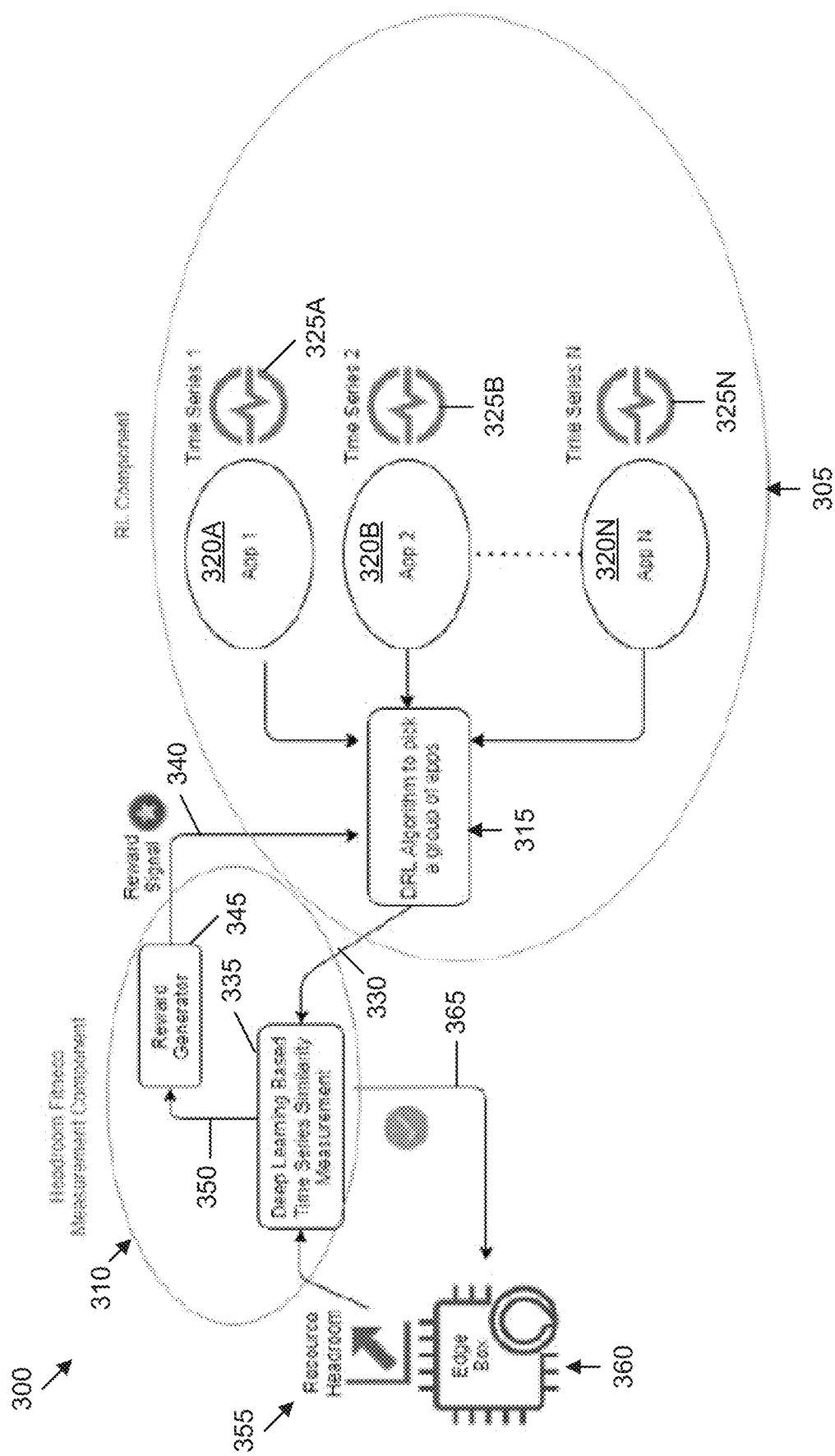
FIG. 3 is an example block diagram of a back-end server of the application profiling system of FIG. 1, in accordance with some embodiments of the present disclosure.

Turning to FIG. 3, an example block diagram of a server 300 is shown, in accordance with some embodiments of the present disclosure. The server 300 is analogous to the server 125 of FIG. 1. Thus, although not shown, the server 300 includes a processor that executes computer-readable instructions stored on a non-transitory computer readable medium, such as memory. The server 300 may be used for selecting one or more applications for installing on an edge device based upon the resource headroom on that edge device. The "applications" that may be installed on the plurality of edge devices 105 may include software applications. Specifically, the applications may include those that use computing power (e.g., require CPU utilization and may be associated with external and internal memory) to control various aspects of the plurality of edge devices 105 on which those applications are installed. For example, the applications may include those that may control machine rotation speed, control temperature, transfer data (e.g., metric data, etc.) from sensors and applications to other components (e.g., the agents 115), graphics and display driver related applications, etc. In some embodiments, the applications may be off-the-shelf type applications. In other embodiments, the applications may be custom applications programed to achieve a specific function (e.g., to use machine data, sensor data, temperature data, program to act on communicated data, etc.). In some embodiments, the applications may include a specific machine learning model.

In some embodiments, the server 300 may implement an artificial intelligence/machine learning based algorithm. The algorithm may be trained by applying the resource utilization required of each application that may be installed on the plurality of edge devices 105. The goal of the algorithm is to efficiently manage the resource headroom of the plurality of edge devices 105 by intelligent placement of applications using artificial intelligence/machine learning. In some embodiments, the server 300 may implement a combination of deep learning and deep reinforcement learning techniques once the resource headroom of the plurality of edge devices 105 is known. Specifically, the resource utilization data of each application that may potentially be installed on the plurality of edge devices 105 may be collected and fed into a Deep Reinforcement Learning (DRL) algorithm (e.g., Deep Deterministic Policy Gradient) to select a group of applications, which may then be validated by a Deep Learning based algorithm to output a fitness score for the chosen group of applications with respect to the resource headroom of the plurality of edge devices 105 at a particular point in time. A reward signal for the DRL algorithm may be designed to accurately depict the fitness score with respect to the resource headroom of the plurality of edge devise 105 to make the DRL algorithm learn progressively in an episodic manner resulting in an algorithm that selects the right applications to be deployed on the plurality of edge devices 105 over time.

Therefore, the server 300 may be considered to have two main components: a decision making component 305 and a headroom fitness measurement component 310. The decision making component 305 may implement a DRL algorithm 315, which may be configured to select a group of applications from a list of applications 320A-320N (collectively referred to herein as the applications 320). Each of the applications 320 may have a time-series map for desired or suitable resources consumed by the application. For example, the application 320A may have a time-series map 325A mapping time-series data of one or more resources (e.g., CPU, memory, network, etc.) consumed by that application. Although a single time-series map (e.g., the time series map 325A) is shown for all the resources of the application 320A, in some embodiments, each resource for which time-series data is desired may have a separate time-series map. Similarly, the application 320B may have a time-series map 325B and the application 320N may have a time-series map 325N. The time-series maps 325A-325N are collectively referred to herein as the time-series maps 325. The time-series maps 325 of the applications 320 may be input into the DRL algorithm 315. The DRL algorithm 315 may also receive the resource headroom of an edge device for which the group of applications is to be selected. The DRL algorithm 315 is explained in further detail below.

The DRL algorithm 315 selects a group of applications 330 from the applications 320 and sends the group of applications to a Deep Learning (DL) algorithm 335. The DRL algorithm 315 may select the group of applications 330 to maximize a reward indicated in a reward signal 340. The reward signal 340 may be generated by a reward generator 345 based upon a fitness score 350 received from the DL algorithm 335. The DL algorithm 335 generates the fitness score 350 based upon a suitability of the group of applications 330 for a resource headroom 355 of an edge box 360 for which the groups of applications have been selected. For example, the DL algorithm 335 may output the fitness score 350 to the reward generator 345 that indicates a positive reward for the DRL algorithm 315 each time the DRL algorithm successfully selects a right group of applications (e.g., the group of applications 330) that fits the resource headroom 355 of the edge device 360. Similarly, the DL algorithm 335 may output the fitness score 350 to the reward generator 345 that indicates a negative reward for the DRL algorithm 315 each time the DRL algorithm 315 picks a group of applications that do not fit within the resource headroom 355 of the edge device 360. The reward signal 340, therefore, may be a feedback signal indicative of how well the group of applications 330 fit into the resource headroom of an edge box.

Specifically, the resource headroom 355 of the edge device 360 may indicate the amount of the resources allocated to the edge device 360 that are available for consumption. The DRL algorithm 315 is intended to identify the group of applications 330 that best consume the available resources of the edge device 360. Different ones of the applications 320 may have different resource utilizations. For example, say the application 320A consumes 1 Gigabytes (GB) of memory with a CPU utilization of 30% CPU at a network bandwidth of 10 Megabytes per second (MBps), the application 320B consumes 2 GB of memory with a CPU utilization of 45% at a network bandwidth of 20 MBps, and the application 320N consumes 1.5 GB of memory with a CPU utilization of 10% at a network bandwidth of 5 MBps. Also, as an example, say the resource headroom 355 of the edge device 360 indicates that the edge device has a CPU utilization headroom of 45%, a memory headroom of 1 GB, and a network bandwidth headroom of 7 MBps.

Based on the resource headroom above of the edge device, even though the application 320A may be good fit for the edge device based upon the CPU consumption (since the application consumes 30% CPU, which is less than the edge device CPU headroom of 45%) and memory consumption (since the application consumes 1 GB of memory, which is equal to the edge device memory headroom of 1 GB), the application 320A may not be a good fit based on network bandwidth (since the application requires a network bandwidth of 10 MBps, which is more than the 7 MBps that the edge device has available). Similarly, the application 320B, which consumes 2 GB of memory with a CPU utilization of 45% at a network bandwidth of 20 MBps may be a good fit for the edge device in terms of CPU utilization, that application may require more memory and network bandwidth than the edge device has room for. Similarly, the other applications may fit the headroom for a certain resource on the edge device but not another resource headroom of the edge device.

The DRL algorithm determines the various permutations and combinations of the resource utilizations of the various applications (e.g., the applications 320) and selects a group of applications whose resource utilizations best use the available resources (e.g., the resource headroom 355) on the edge device 360. As the number of the applications 320 from which to select increases, the number of permutations and combinations increase as well. Determining a group of applications that are appropriate for the resource headroom 355 of the edge device 360 may ensure that each application that is installed on the edge device is operating at optimum capacity. If an application installed on the edge device 360 needs more CPU utilization than the edge device has room for, not only will the application run slow, that application may impact the operation of the other applications installed on that edge device. Thus, selecting a proper group of applications based on the resource headroom 355 of the edge device 360 may ensure an optimum operation of the edge device, while also ensuring that the allocated resources of the edge device are used at full capacity. This may allow more applications to be run using fewer number of edge devices, providing cost savings in procuring and maintaining edge devices.

In addition to receiving the group of applications 330 from the DRL algorithm 315, both the DL algorithm 335 and the DRL algorithm 315 may receive the resource headroom of each of the plurality of edge devices 105 (or at least the headroom of those edge devices on which one or more of the group of applications may be installed). For example, the DL algorithm 335 may receive the resource headroom 355 of the edge device 360. The resource headroom 355 may be represented as a multi time-series map (e.g., similar to the time-series map 200) indicating resource consumption and resource availability of a variety of resources of the edge device 360. Similar to the edge device 360, the DL algorithm 335 may receive the headroom information (e.g., similar to the time series map 355) of other edge devices (e.g., the plurality of edge devices 105). Based on the resource headroom 355 of the edge device 360 and the group of applications 330, the DL algorithm 335 determines a fitness score indicating how suitable the group of applications are for the resource headroom 355 of the edge device 360. In other words, the DL algorithm 335 determines how best the group of applications 355 consume the resource headroom 355 of the edge device 360. For example, if the DL algorithm 335 determines that the combined CPU utilization of the group of applications 330 exceeds the CPU headroom of the edge device 360 by a certain threshold, the DL algorithm may determine that the group of applications is not a suitable fit for the edge device 360. The DL algorithm 335 may look at the various permutations and combinations of the combined resource utilizations of the group of applications 330 to determine whether the group of applications optimally consume the available resources of the edge device 360. The DL algorithm 335 is also discussed in greater detail below.

Figure 4:
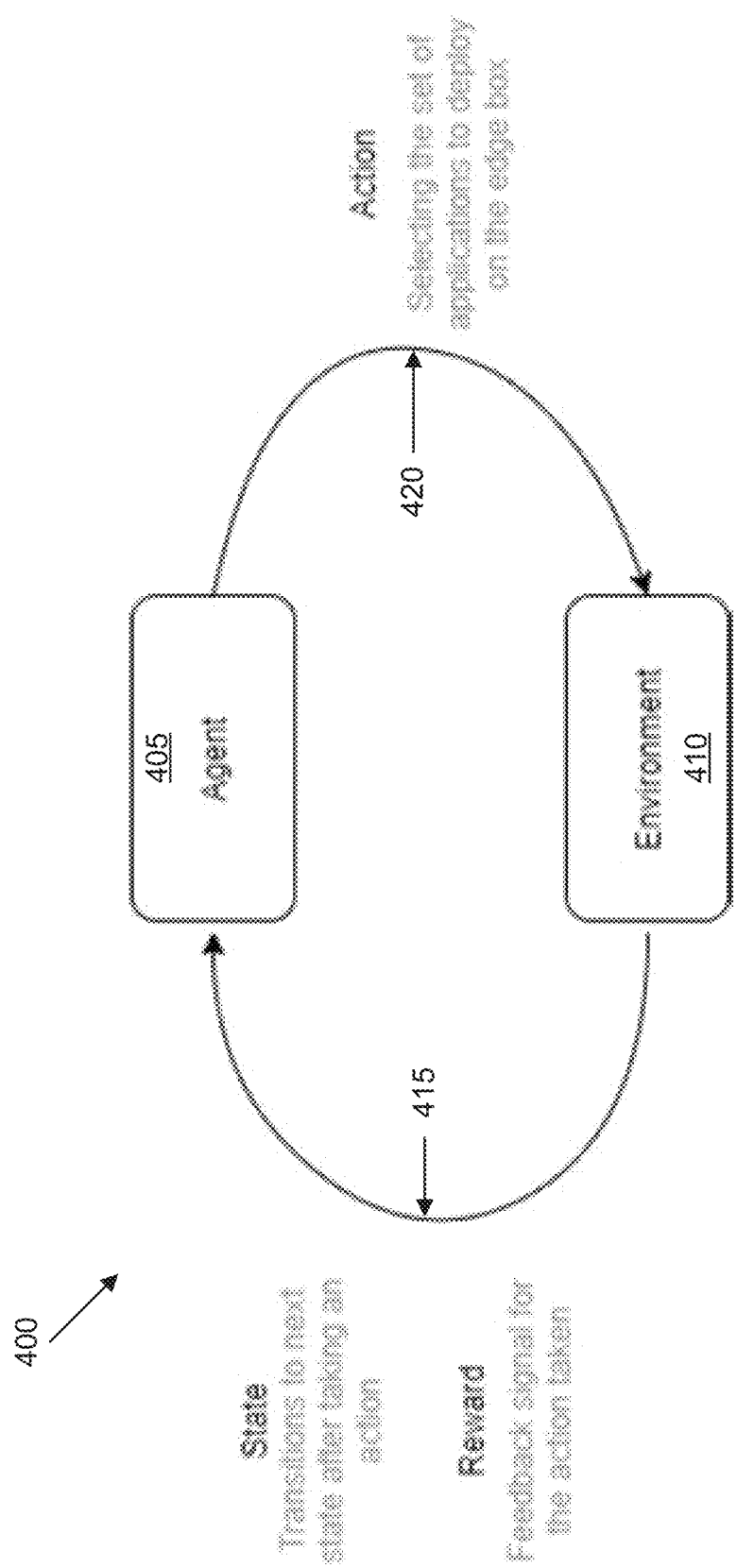
FIG. 4 is an example state diagram of a Deep Resource Learning (DRL) algorithm implemented by the back-end server of FIG. 3, in accordance with some embodiments of the present disclosure.

Turning to FIG. 4, an example diagram of a state machine 400 of the DRL algorithm 315 is shown, in accordance with some embodiments of the present disclosure. The DRL algorithm 315 includes two main components: an agent 405 and environment 410. The agent 405, which is the algorithm, interacts with the environment 410, which is the problem setting, to select the group of applications 330. Specifically, the agent 405 may interact with the environment 410 by means of taking actions (e.g., choosing a set of applications). The actions allow the agent 405 to directly influence the environment 410 based on the reward signal 340. The goal of the agent 405 is, thus, to maximize the cumulative reward after multiple iterations of the state machine 400 resulting in the agent selecting the right group of applications 330 over time and finding a near-optimal policy.

The Reinforcement Learning (RL) process of the state machine 400 may be modelled as a loop having multiple iterations. For example, in the first iteration, the agent 405 may receive a state 415 (e.g., state S0) from the environment 410. The state 415 may indicate the resource utilizations of the various applications 320. The state 415 may also include the resource headroom 355 of the edge device 360. In the first iteration, the state may include an initial observation of the environment (e.g., the time-series maps 325 of the applications 320). Based on the state 415 (e.g., the state S0), the agent 405 takes an action 420 (e.g., an action A0). The action 420 may output a group of applications (e.g., the group of applications 330). After completion of the first iteration, the state machine 400 may transition to the next iteration. In the next iteration, the environment 410 may transition to a new state (e.g., state 51) of the state 415. In some embodiments, a state change or transition may occur when a change in the resource headroom/utilization (e.g., change in the time-series map 325) of at least one of the applications 320 is detected. When the state change occurs, the environment 410 may send the new time-series maps 325 to the agent 405 based on which the agent may output a new group of applications. The above loop may continue until the environment 410 sends a terminal state to the agent 405.

In addition to the state 415, the environment 410 may also send a reward, R, received via the reward signal 340 to the agent 405. The reward may be a positive reward if the group of applications 330 chosen by the agent 405 in the previous iteration were a suitable fit for the resource headroom 355 of the edge device 360. Otherwise, the reward may be negative reward. Based upon the state 415 and the reward, the agent 405 then selects a new group of applications and sends the updated group of applications to the DL algorithm 335. Specifically, the goal of the agent 405 is to maximize the expected cumulative reward. Because Reinforcement Learning is based on the idea of the reward hypothesis, all goals may be described by the maximization of the expected cumulative reward. Thus, to have the best behavior, the expected cumulative reward is maximized by the agent 405.

Thus, the state machine 400 may be considered a continuous transition loop that transitions to a next state after taking an action and when a change in the resource utilization of the applications 320 is detected. The state machine 400 outputs a sequence of states, actions and rewards. In some embodiments, an example of the DRL algorithm 315 that implements the state machine 400 may be a Deep Deterministic Policy Gradient, which may work well in continuous action space. In this case, the action space may be continuous as the number of applications that may be chosen doesn't have to be fixed but rather limited based upon the total number of applications available to choose from.

Thus, the environment 410 provides the state on which the agent 405 acts on using an RL algorithm. The environment 410 starts, in a first iteration, by sending a state (e.g., the resource utilization data of applications and resource headroom of an edge box) to the agent 405. Based on the received state, the agent 405 may take an action that selects a group of the applications for installing on the edge box. In subsequent iterations, the environment 410 may send a pair of next state and reward back to the agent 405. The agent 405 may update its action based upon the reward returned by the environment and the agent's last action. The loop of receiving state and reward information from the environment 410 and the agent 405 updating its action continues until the environment sends a terminal state, which ends the loop.

Figure 5:
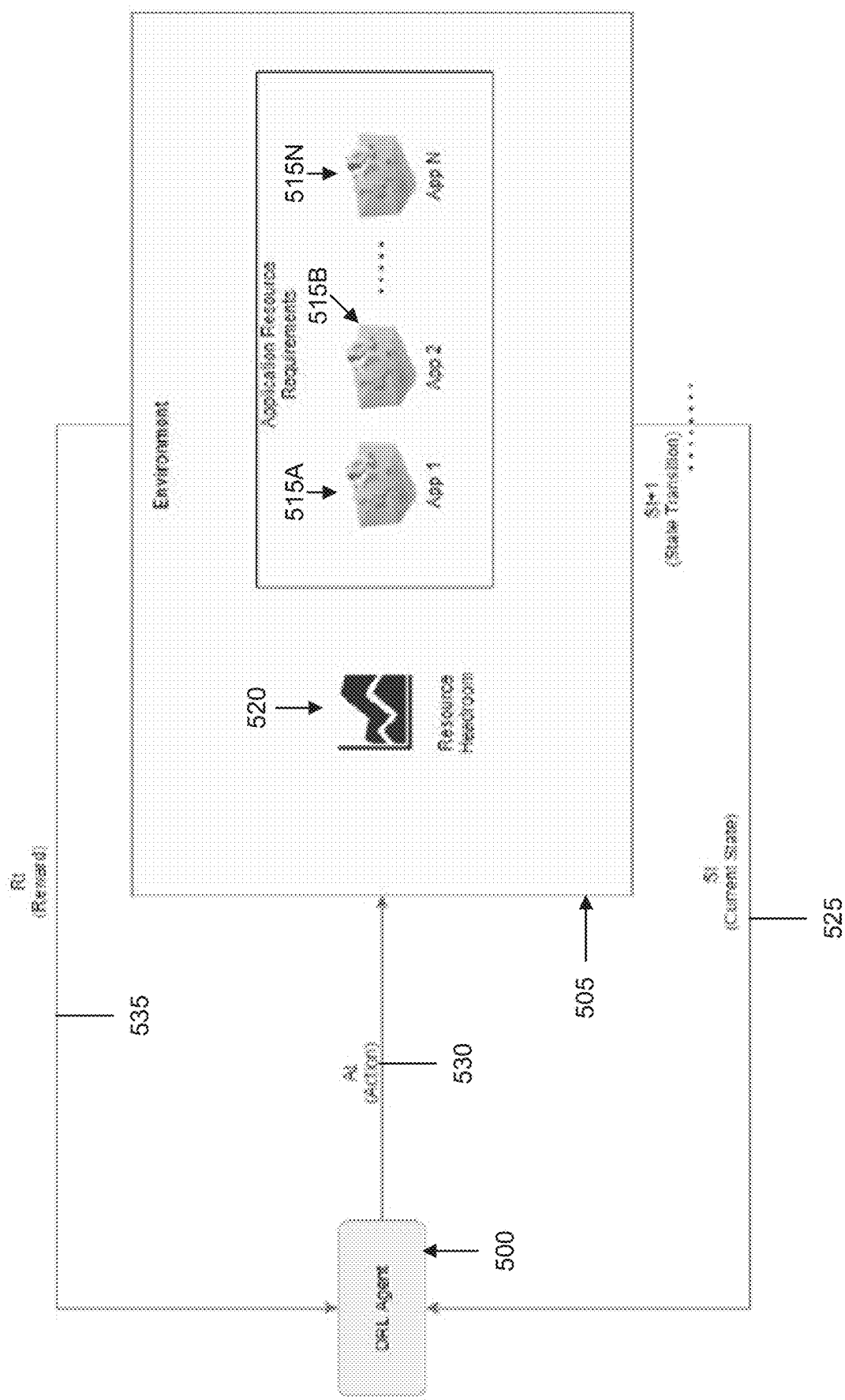
FIG. 5 shows additional details of FIG. 4, in accordance with some embodiments of the present disclosure.

Turning to FIG. 5, an example block diagram shows additional details of the DRL algorithm 315, in accordance with some embodiments of the present disclosure. Specifically, the block diagram shows further interaction between an agent 500 and an environment 505 of the DRL algorithm. The agent 500 is analogous to the agent 405 and the environment 505 is analogous to the environment 410. The environment 505 receives multi-variate time series data from one or more applications 515A-515N (collectively referred to herein as the applications 515). The applications 515 are analogous to the applications 320. Specifically, the environment 505 receives resource utilization data of the applications 515. In some embodiments, the environment 505 may also receive a resource headroom 520 (e.g., the resource headroom 355) of an edge device (e.g., the edge device 360) for which a group of applications is to be selected. The resource headroom 520 and the resource utilization data of the applications 515 may represent a state 525 of the environment. Thus, the "state space" of the environment may be represented by the pair of data from the resource headroom 520 and the resource utilization data of the applications 515.

In some embodiments, the "state space" may be associated with an "observation space" that may be observable by the agent 500. For example, the agent 500 may be able to "observe" the entire "state space" at any time instant, t. The vector of all application requirements at the time instant, t (e.g., the time-series data of the applications 515) and the resource headroom 520 may be input in to the agent 500 at the time instant, t, which may be the same as a current state of the environment 510. Based on the data in the "state space" and the "observation space," the goal of the agent 500 is to select a group of applications from the applications 515 for installing on the edge device associated with the resource headroom 520. Thus, the agent 500 may take an action 530 by which the agent may select a group of applications from the application 515. The action taken by the agent 500 may be considered part of an "action space." At any given time, there may be N number of the applications 515 for the agent 500 to choose from. The number of the group of applications that the agent 500 chooses may vary to be less than or equal to N. Thus, for example, the agent 500 may select any number of applications between 1 and N.

Further, the agent 500 may also receive a reward 535 from the environment 510. In some embodiments, the reward 535 may be based on (e.g., same as) the reward signal 340 sent by the reward generator 345 most recently. In other embodiments, the reward 535 may be the cumulative reward collected by the agent so far. The reward 535 may be part of a "reward space." The reward 535 may be varied to change the behavior of the agent 500. The main goal of the agent 500 is to minimize the headroom of an edge box to better utilize its allocated resources. Thus, if the agent 500 previously selected a group of applications that don't fit into the headroom of an edge box, the reward 535 may be a zero reward or a negative reward (e.g., −100). If the agent 500 previously selected a group of applications that fit within the headroom of an edge box, the reward 535 may be a positive reward (e.g., +100). The agent 500 attempts to maximize the cumulative reward, thereby achieving an optimization of selecting applications that best fit into the resource headroom of an edge box over time.

Thus, in each iteration, the agent 500 may receive the current state (e.g., the state 525) of the environment and the reward 535. The current state may include the time-series data of the applications 515 and the resource headroom 520 of the edge box on which an application is to be installed. The agent 500 may also have the previous states of the environment 510 available thereto. Based upon the current state and the previous states, as well as the reward, the agent 500 selects one or more applications from the applications 515 for installation on the edge box in such a way that maximizes the agent's cumulative reward. To select the one or more applications from the applications 515, the agent 500 may be trained. Training of the agent 500 is discussed in FIG. 6 below.

Thus, turning to FIG. 6, an example block diagram of a Deep Deterministic Policy Gradient (DDPG) algorithm 600 is shown, in accordance with some embodiments of the present disclosure. DDPG may be considered a type of the DRL algorithm 315. As discussed above, in some embodiments, the agent 500 may implement a DDPG algorithm to select the one or more applications from the applications 515. Before the training of the agent 500 begins, a simulation environment (e.g., similar to the environment 510) to represent the problem setting may be set up. At each state of the simulation environment, the agent 500 may be able to perceive the environment and take actions to directly influence the environment and transition to the next state. In such a simulation environment, a deep neural network agent (e.g., the agent 500) may be trained in an episodic manner. In each episode, a certain number of applications (e.g., the applications 515) arrive and the agent 500 makes a decision (e.g., selects one or more applications for an edge box). When all the applications have been assigned to one or more edge boxes, the episode comes to an end.

In an episode, at any time instant, the environment state, $s_t$, and a reward, $r_t$, may be perceived by the agent 500 based on which the agent takes an action, $a_t$. The state, si, the reward, ri, and the action ai, of an episode may form a trajectory, $[s_1, a_1, r_1, \ldots, s_L, a_L, r_L]$, where L is the number of decisions made by the agent 500 in an episode. In order to train a generalized decision-making policy, several application sequences having a variety of resource utilization time series data and various example resource headroom data of an edge box may be generated, and each of the sequences may be used to train the agent 500 through several iterations. And in each iteration, N simulations may be performed in the agent 500 to obtain N trajectories. The goal of the agent 500 is to learn a policy (control strategy) 7C that maximizes the expected return (cumulative, discounted reward).

Figure 6A:
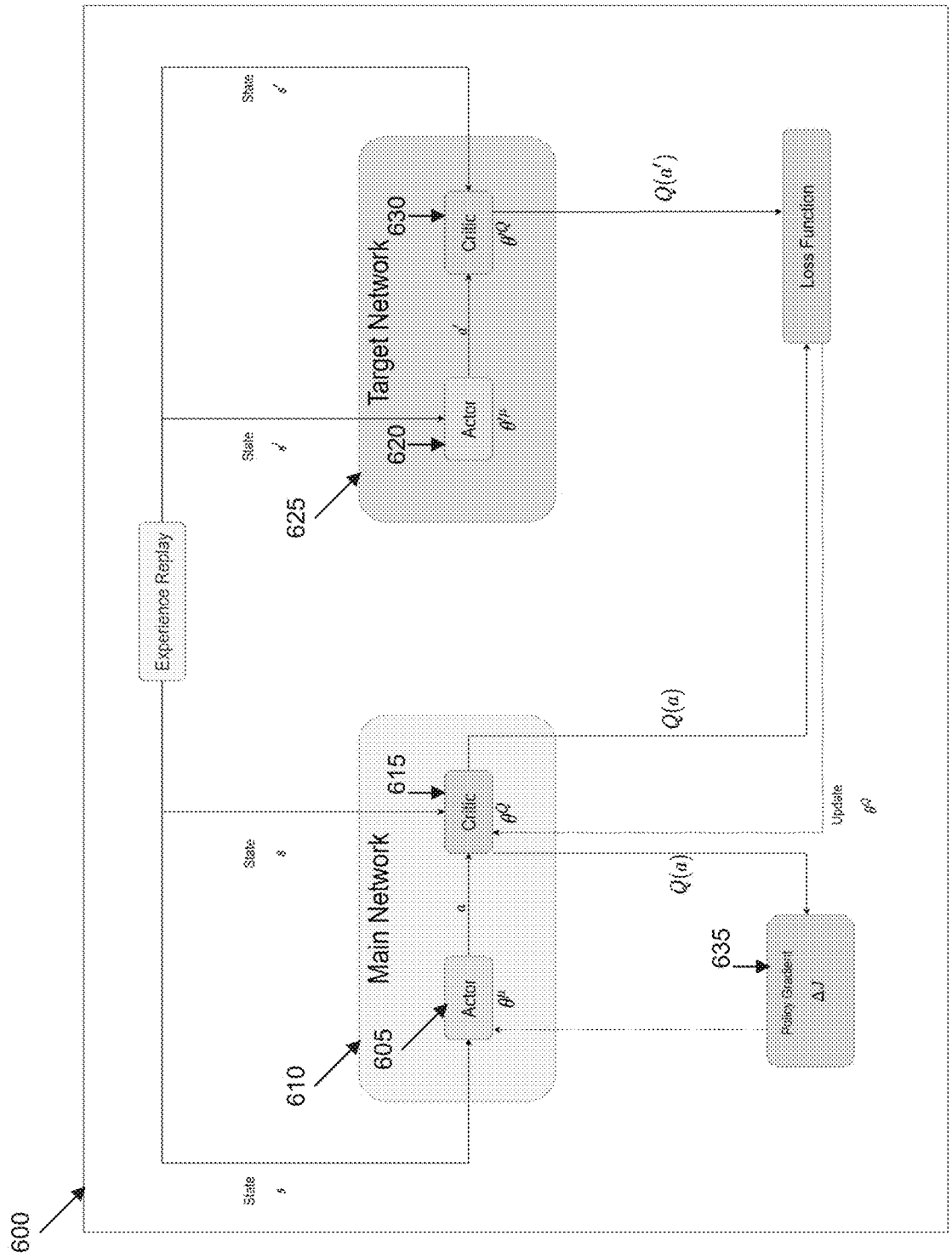
FIGS. 6A and 6B are example block diagrams of a type of DRL algorithm, in accordance with some embodiments of the present disclosure.
Figure 6B:
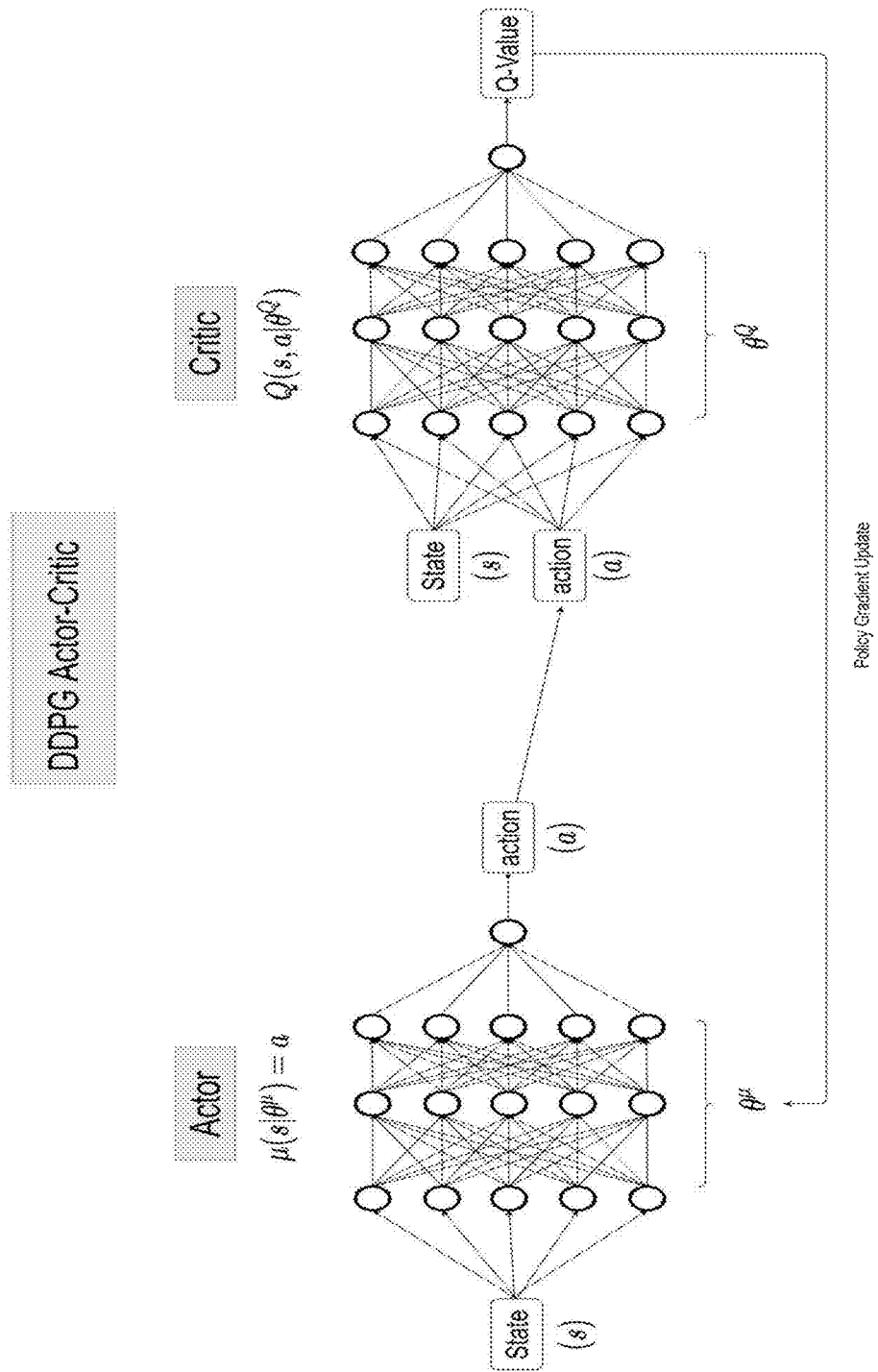

As discussed previously, the DDPG algorithm may work well in this setting. Specifically, DDPG is an algorithm which concurrently learns a Q-function (e.g., Q(a) and Q(a')) and a policy. It uses off-policy data and Bellman equation to learn the Q-function and uses the Q-function to learn the policy. The original deep Q-network (DQN) may be used in tasks with a discrete action space. To extend DQN to continuous control, DDPG may use deep neural networks on the actor-critic reinforcement learning method, where both the policy and value of the reinforcement learning are represented through hierarchical networks. The network framework of DDPG is shown in FIGS. 6A and 6B. The DDPG algorithm maintains a parameterized actor function $\mu(s|\theta^\mu)$ which specifies the current policy by deterministically mapping states, s, to a specific action, a. The actor function parameters may be updated by using the following equations:

$$\nabla_{\theta^\mu} J \approx \mathbb{E}_{s_t \sim \rho^\beta}[\nabla_{\theta^\mu} Q(s,a|\theta^Q)|_{s=s_t, a=\mu(s_t|\theta^\mu)}]$$

$$= \mathbb{E}_{s_t \sim \rho^\beta}[\nabla_a Q(s,a|\theta^Q)|_{s=s_t, a=\mu(s_t)} \nabla_{\theta_\mu} \mu(s|\theta^\mu)|_{s=s_t}]$$

In the equation above, s=State; a=action; $s_t$=State at time step t; $a_t$=Action at time step t; $\mu$=Policy; Q=Q value; and $\rho^\beta$=state visitation distribution.

The critic Q (s, a) in the equation above may be learned using the Bellman equation as in Q-learning. The Target Network is a copy of the actor and critic network, its role is to improve the stability of learning. The DDPG algorithm uses 4 individual neural networks:

$\theta^\mu$—Main Policy Network (Actor) 605 of a main network 610

$\theta^Q$—Main Q-Network (Critic) 615 of the main network 610

$\theta^{\mu'}$- Target Policy Network (Actor) 620 of a target network 625

$\theta'^Q$—Target Q-Network (Critic) 630 of the target network 625

The Main Policy network (Actor) 605 maps states directly to actions. The main Q-Network (Critic) 615 estimates the Q-values for the actions taken by the Main Policy network (Actor) 605—a measure of how good is it to take an action for being in a state s, taking into account the possible future returns for taking that action. The Q-Network learns exactly the same way as DQN. The Main Policy network (Actor) 605 may be updated with respect to the critic parameters using policy gradients 635 by applying a chain rule from the start distribution to essentially maximize the returns for learned policy, as shown in greater detail in FIG. 6B. The Target Policy Network (Actor) 620 and the Target Q-Network (Critic) 630 are clones of the main networks (the Main Policy network (Actor) 605 and the Main Q-Network (Critic) 615) but are used to ensure stable learning as the Critic involves computing Q-values for immediate states as well, performing two forward passes on the same network and back-propagating the errors can push Qs for states, S and S', in the same direction leading to unstable behavior. So, a cloned copy of the networks may be maintained to compute the immediate future Qs.

Suppose the Main Network's (e.g., the Main Policy network (Actor) 605 and the Main Q-Network (Critic) 615) parameter is θ, the Target Network's (e.g., the Target Policy Network (Actor) 620 and the Target Q-Network (Critic) 630) parameter may be θ'. θ' may then be updated by with τ<<1:

$$\theta' \leftarrow \tau\theta + (1-\tau)\theta'$$

Unlike Q-Learning, the updates in DDPG may be considered soft, meaning that only a fraction of Main Network's (e.g., the Main Policy network (Actor) 605 and the Main Q-Network (Critic) 615) weights are copied over to the Target Network (e.g., the Target Policy Network (Actor) 620 and the Target Q-Network (Critic) 630) governed by a parameter τ which is less than 1. Thus, τ<<1 means that the Target Network's (e.g., the Target Policy Network (Actor) 620 and the Target Q-Network (Critic) 630) parameters θ is constrained to change slowly (<<1), thereby improving stability.

Additionally, to make efficient use of hardware optimizations, the agent 500 may be trained in small batches as opposed to online. Thus, the agent 500 may be associated with a replay buffer, which may include the state, action, reward, and the next state information at each time step (e.g., time, t). An online network and target network may be updated by sampling a mini batch of data uniformly from the replay buffer.

Thus, in DDPG, the actor may perform actions and learn a behavioral policy for the environment and based on the actions of the actor, the critic may compute a value approximation with respect to the current state, action, and expected future rewards. Based on the value approximation, a policy gradient may be computed to update the weights of the main network helping the main network to take relevant actions. Since the critic has to evaluate the future returns as well, to obtain the exact cumulative reward/return for being in a specific state—there is a need to follow the actions and reach the terminal state before getting the exact cumulative reward for being in a state. However, if one actor-critic network does both these things simultaneously, it may lead to unstable behavior causing the agent to perform poorly. So, a clone of the Main Network 610 may be maintained as the Target Network 625 and softly updated at fixed time steps. The Main and Target Networks work together as a single agent to solve the environment.

Once the agent (DDPG) is trained on the environment and it starts to perform reasonably well, the target network can be loaded used to perform actions independently on the environment. So, the output from the agent is, it performs actions to influence the environment. The environment returns back a reward for the actions and changes state, agent observes and continues until a terminal state is reached.

Once the agent 500 is trained using simulation data, the agent may start selecting groups of applications using actual data. In some embodiments, the agent 500 may continue to be train itself and evolve using the actual data. An example output that the agent 500 may generate is shown in Table 1 below:

| timestamp | Application Groups | Application 1 | Application 2 | ... | Application N |
|---|---|---|---|---|---|
| T = 0 | Application Group 1 | 1 | 1 | ... | 0 |
| T = 1 | Application Group 2 | 0 | 1 | ... | 0 |
| ... | ... | ... | ... | ... | ... |
| T = N | Application Group N | 0/1 | 0/1 | ... | 0/1 |

In the above table, each row represents the decision made by the agent 500 at a particular point in time. The group of applications may be selected from the applications 515 (shown in a row of the table above as Application 1, Application 2, . . . Application N). The selection of each application in a row may be denoted by a binary value (e.g., 0 or 1) where 0 denotes that the application has not been chosen at that time instant and 1 denotes that the application has been chosen at that time instant. For example, in the table above, row 2 at time, T=0, applications 1 and 2 are indicated as being selected while application N is indicated as being not selected. Similarly, row 3, at time, T=1, applications 1 and N are not selected and application 2 is selected. Thus, each application may be either selected or not selected at each time instant.

The selected group of applications from each row may constitute the group of applications 330, which may be input into the DL algorithm 335. The DL algorithm 335 may represent the group of applications 330 as finite temporal sequences that may be summed at application level to obtain a total possible utilization for all of the groups of applications combined. Specifically, the DL algorithm 335 may combine the values of each of the resource utilizations of each of the group of applications 330 for determining a fitness score. For example, in some embodiments, the CPU utilizations of each of the group of applications 330 maybe combined to obtain a combined CPU resource utilization. Similarly, the memory utilization of each of the group of applications 330 maybe combined to obtain a combined memory utilization, and so on. The combined or overall resource utilizations may then be used by the DL algorithm 335 to estimate a similarity or fitness score of the group of applications 330 for the resource headroom 355 of the edge box 360. In other words, the fitness or similarity score may determine how suitable the group of applications 330 are for the resource headroom 355 of the edge device 360. The higher the similarity or fitness score, the better suited the group of applications 330 are for the edge device 360. The DL algorithm 335 may use the fitness score to determine the reward for the agent of the DRL algorithm 315. In general, the higher the fitness score, the higher is the reward for the DRL algorithm 315. Thus, the DL algorithm 335 may output the fitness score 350 indicating whether the reward generated by the reward generator 345 is to be a positive reward or a negative or zero reward, as well as a value of the reward (e.g., +100, −100, etc.). In some embodiments, the DL algorithm 335 may determine the fitness score and the reward generator 345 may determine the reward (e.g., whether the reward has to be positive or negative, and/or the magnitude of the reward) based on the fitness score. In some embodiments, the DL algorithm 335 and the reward generator 345 may be combined into a single component.

Figure 7:
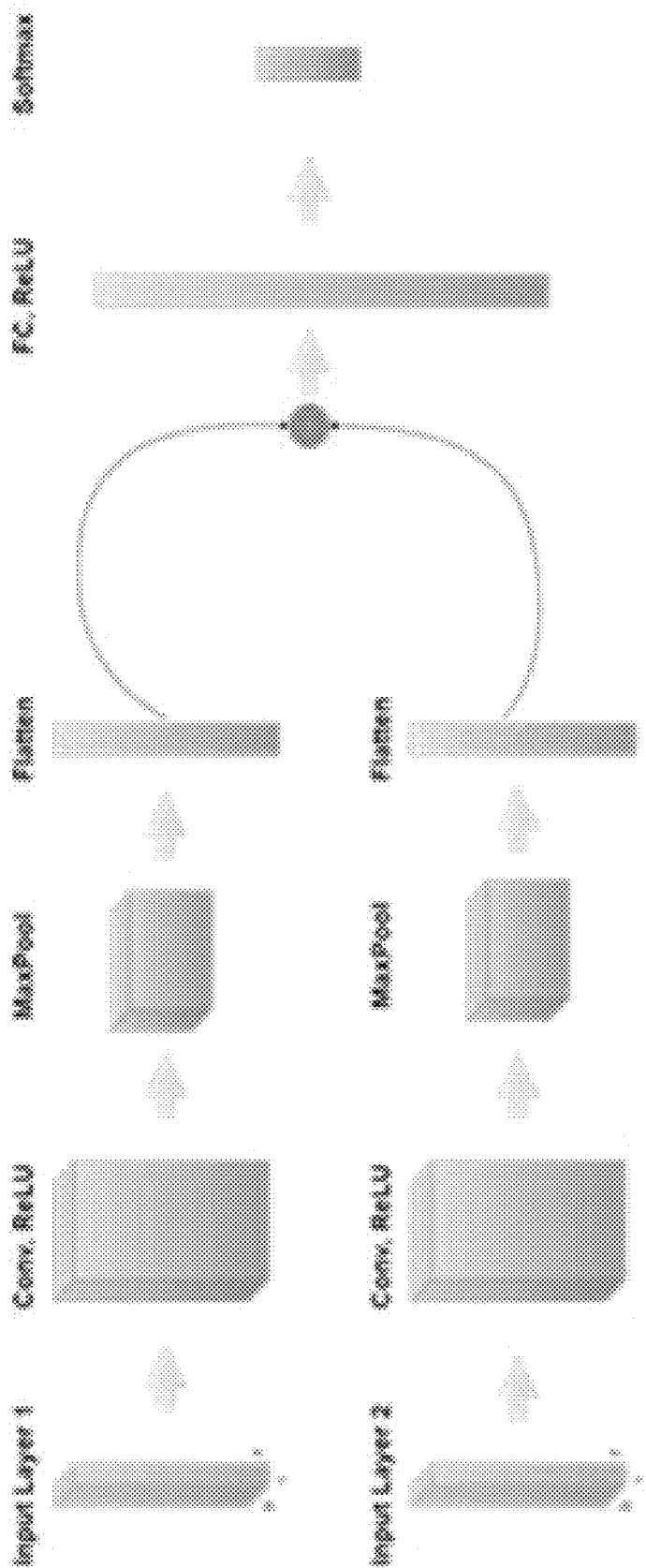
FIG. 7 is an example block diagram of a Convolutional Neural Network (CNN) implemented by the back-end server of FIG. 3, in accordance with some embodiments of the present disclosure.

In some embodiments, the DL algorithm 335 may implement a convolutional neural network (CNN) based approach to determine the fitness score. The CNN approach makes use of historical multi-variate time-series data of the resource headroom 355 of the edge device 360 to determine the fitness score for the group of applications 330 selected for that edge device. Specifically, a CNN-based neural network may be used to learn from the multivariate time-series of the resource headroom 355 data and predict the suitability of the overall utilization computed from the group of applications 330. The CNN based neural network may learn by embedding the time-series of the resource headroom 355 into a vector space and comparing the resultant vectors with the overall resource utilizations of the group of applications 330 and outputting a probability indicative of the fitness score based on similarity. An example of a CNN based algorithm that may be used is shown in FIG. 7.

The CNN based algorithm may be used to learn appropriate subsequences from the input. The lower layers of the CNN may be made to learn lower level details of the time-series data and the deeper layers of the CNN may learn shape patterns or trends in that data. Max-Pooling may help in better feature extraction and reducing the noise in the input. After max pooling, which acts like denoising or down sampling layer, the output may be fed into a fully connected neural network layer after flattening. Here, the similarity embeddings may be obtained. A soft-max layer may be appended at training time. A metric learning loss function like triplet loss may explicitly push similar samples together in embedding space and pull dissimilar samples away from each other, during training. The produced embeddings may then be evaluated with a K-Nearest Neighbor or 1-N-N to assess the extent to which time series sharing the same label are nearby in the embedded space. In some embodiments, the CNN architecture may be further improvised by using inception modules, as discussed in. The Inception network's proven capability in Computer vision tasks together with the scalability of Neural Networks make it a great candidate for this task.

Figure 8:
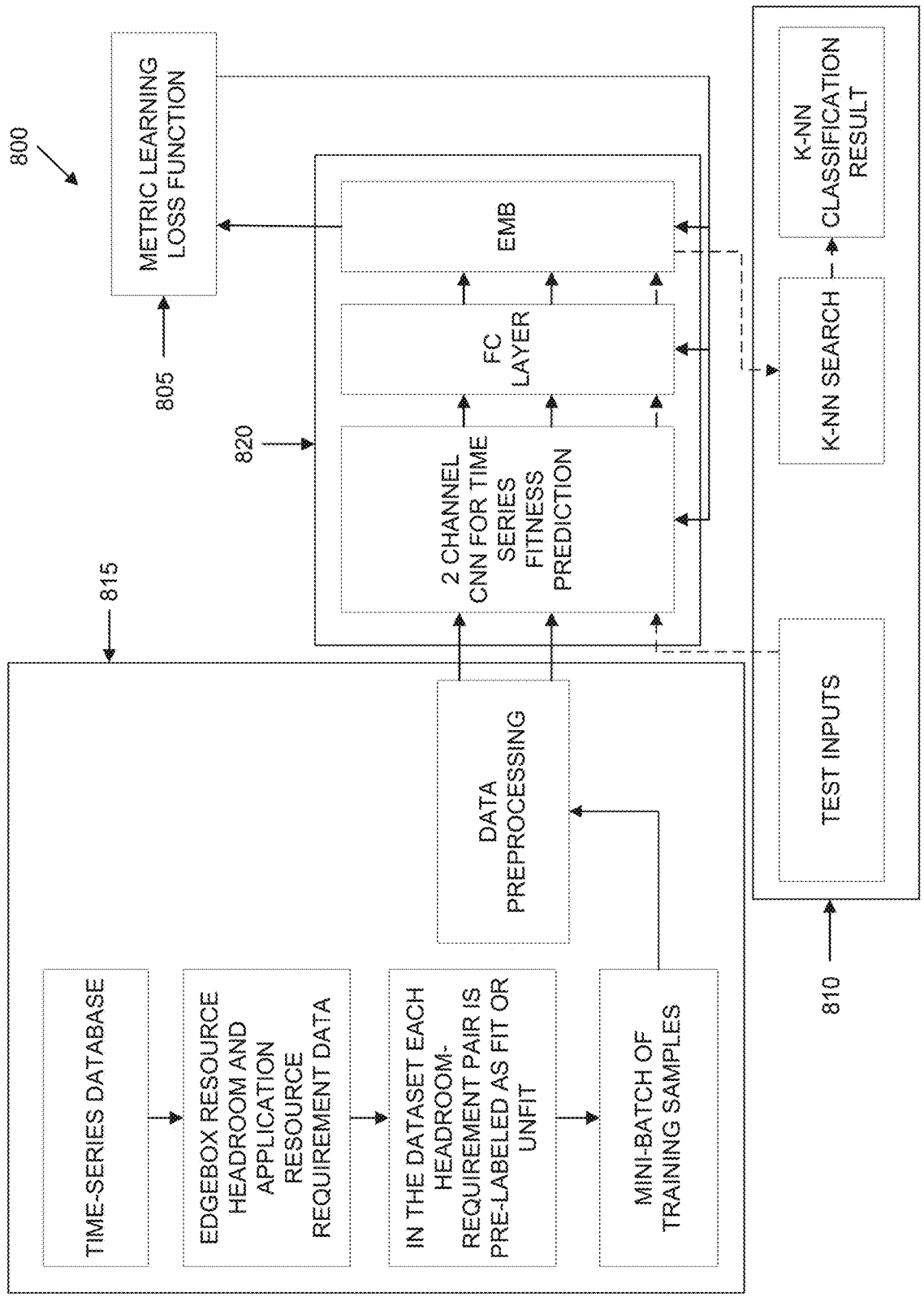
FIG. 8 is an example block diagram of a Deep Learning algorithm implemented by the back-end server of FIG. 3, in accordance with some embodiments of the present disclosure.

FIG. 8 shows an example block diagram 800 of the DL algorithm 335 implementing a CNN based algorithm. Specifically, the block diagram 800 may be divided into multiple phases: a training phase 805, an inference phase 810, a data collection phase 815, and a neural network phase 820. The training phase 805 may be used to train the neural network (e.g., a CNN based algorithm) in the neural network phase 820. In some embodiments, the neural network of the neural network phase 820 may be trained similar to other deep learning networks but with different loss functions that explicitly push similar time-series together (e.g., with respect to class) in embedding space and pull dissimilar time-series away from each other during training. At any instance, t during training, data from a training dataset may be fed to the neural network of the neural network phase 820 and that data may be mapped to an embedding space. A compute penalty on these mappings using a loss function may be computed and the network weights of the neural network may be adjusted using an appropriate optimization technique (e.g., Adam or Stochastic Gradient Descent).

The inference phase 810 may be used to extract features from the embedding layer and perform a nearest neighbor search to identify time-series that are similar with respect to their class (fit/unfit) to enable the neural network of the neural network phase 820 to distinguish between time-series that can fit into the headroom and the ones that do not. The output may be a probability score between 0 and 1. The data phase 815 may include getting time series data, headroom data, and any other input data that may be needed by the DL algorithm 335 to generate a similarity score by the neural network of the neural network phase 820. The neural network phase 820 may receive the data from the data phase 815 and generate a similarity score indicating whether the group of applications 330 selected by the DRL algorithm 315 are a good fit for the edge device 360 or not. For example, in some embodiments, if the group of applications 330 are a good fit, then the neural network of the neural network phase 820 may generate a similarity or fitness score of 1 indicating a good fit. In some embodiments, if the group of applications 330 are not a good fit for the edge box 360, the neural network of the neural network phase 820 may generate a similarity or fitness score of 0. In some embodiments, the neural network of the neural network phase 820 may be configured to generate a sliding scale of the similarity or fitness score between a low threshold (e.g., 0) and a high threshold (e.g., 1) indicating how good of a fit the group of applications 330 are for the edge box 360. Thus, based on the similarity or fitness score, the reward generator 345 may generate a reward for the agent of the DRL algorithm 315.

Thus, the neural network of the neural network phase 820 may output a similarity or fitness score in terms of probability. Based on the similarity or fitness score, the reward generator 345 may generate a reward and send that reward to the DRL algorithm via the reward signal 340. In some embodiments, the similarity or fitness score may be split up into thresholds (e.g., low threshold, high threshold, medium threshold, etc.), based on which the reward generator 345 may determine the amount of the reward. For example, in some embodiments, if the similarity or fitness score indicates a high threshold (e.g., high similarity score), the reward generator 345 may generate a positive reward. In other embodiments, if the similarity or fitness score indicates a low threshold (e.g., low similarity score), the reward generator 345 may generate a zero reward or negative reward.

Figure 9:
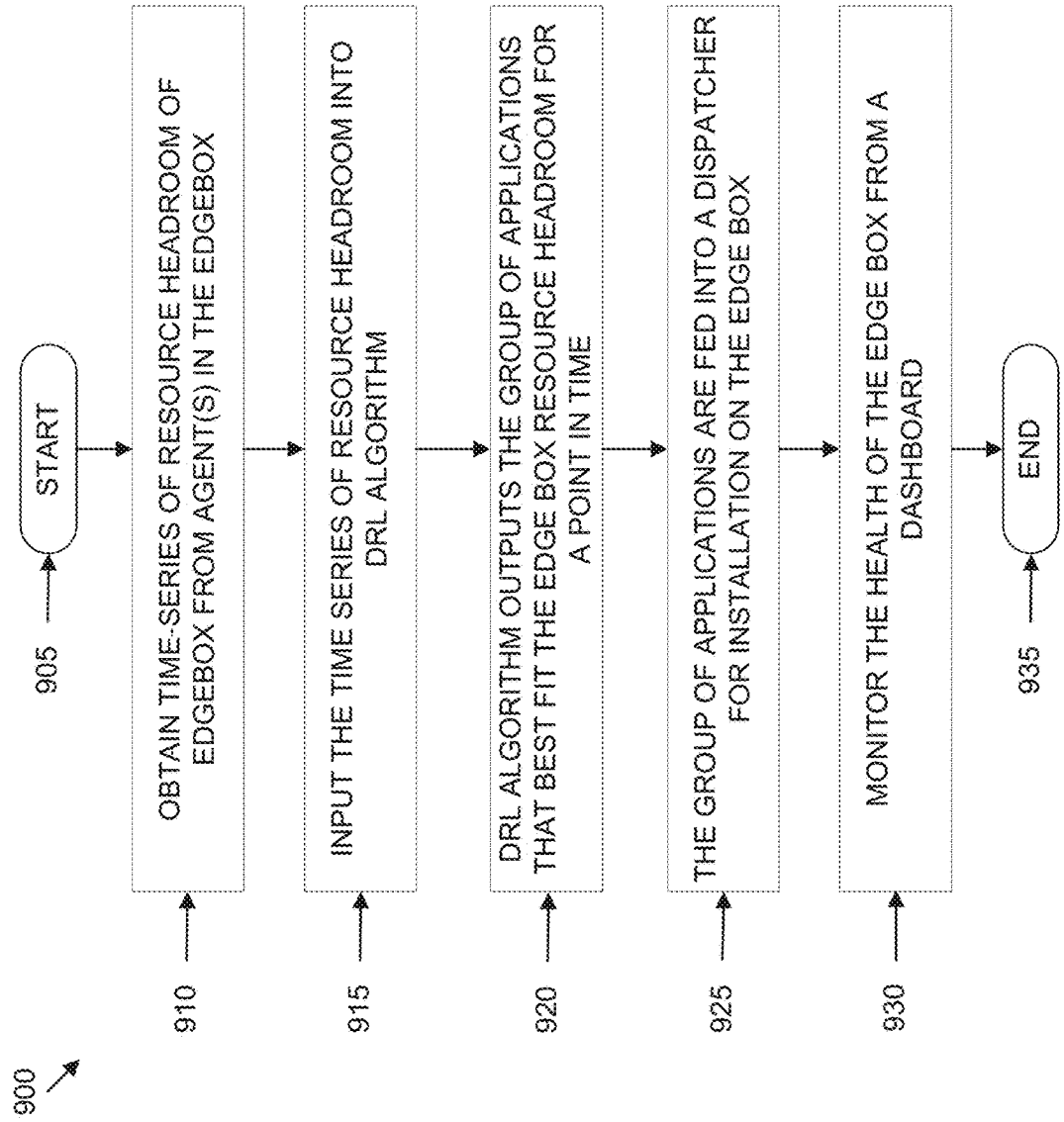
FIG. 9 is an example flowchart outlining operations of a process for selecting a group of applications by the back-end server of FIG. 3 for installing on the edge device, in accordance with some embodiments of the present disclosure.
Figure 11:
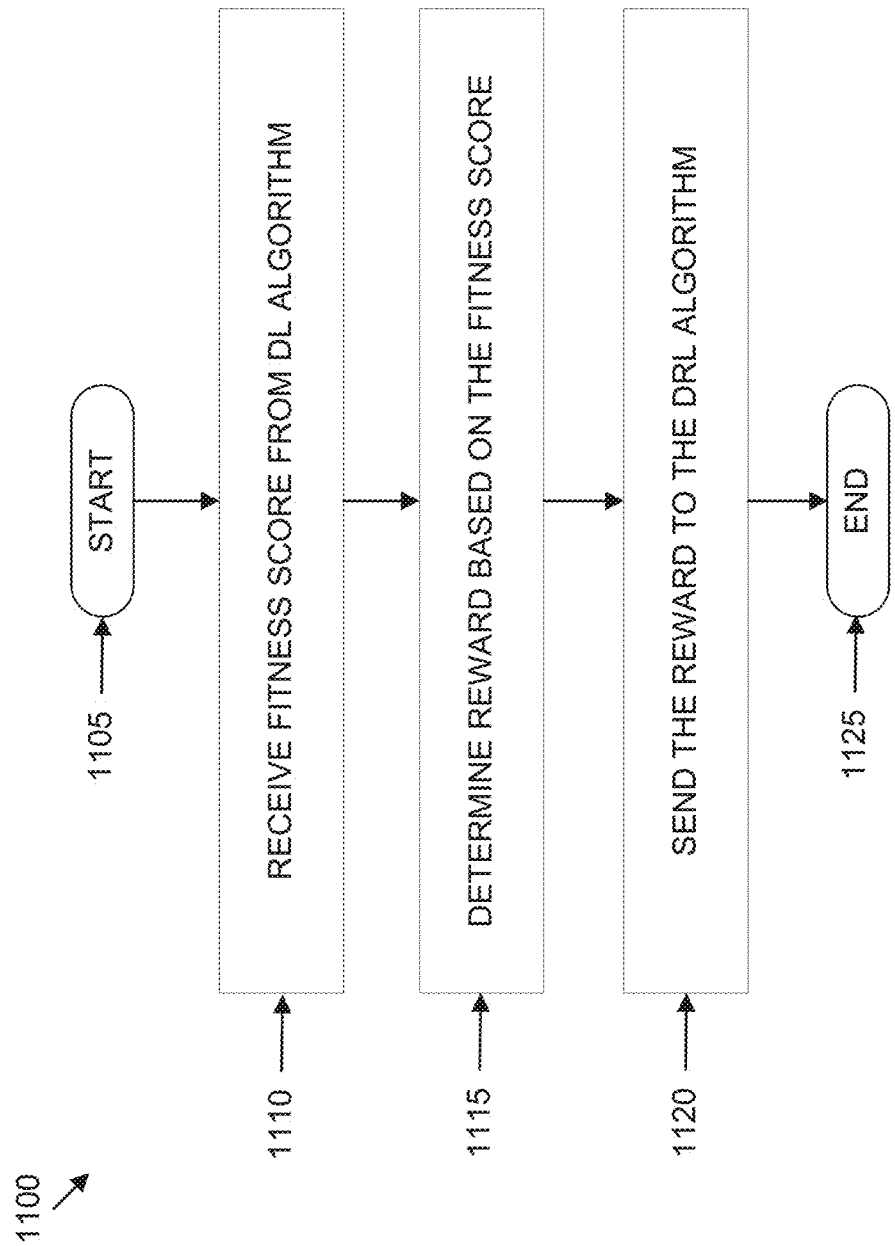
FIG. 11 is an example flowchart outlining operations of a process for determining a reward for the DRL algorithm of FIGS. 4-6, in accordance with some embodiments of the present disclosure.

Turning to FIG. 9, an example flowchart outlining a process 900 is shown, in accordance with some embodiments of the present disclosure. The process 900 may include other or additional operations depending upon the embodiment. The process 900 may be implemented by the DRL algorithm 315, and particularly, by the server 125. The process 900 may be used to select the group of applications 330 from the applications 320. Thus, upon starting at operation 905, the DRL algorithm 315 receives the multi-variate time-series data (e.g., the resource headroom data 520) of one or more edge boxes for which an appropriate group of applications is to be selected at operations 910 and 915. The DRL algorithm 315 also receives the resource utilization data 325 of the applications 320. At operation 920, the DRL algorithm 315 outputs the group of applications 330 for each of the edge boxes whose time series data is received at the operations 910 and 915. The group of applications 330 selected by the DRL algorithm 315 may be used by a dispatcher, at operation 925, to install one or more of the group of applications 330 on the corresponding edge box for which those applications have been selected Upon installation, at operation 930, the user may continue to monitor the edge box using a user interface. An example of the user interface is shown in FIG. 11 below. The process 900 ends at operation 935.

Figure 10:
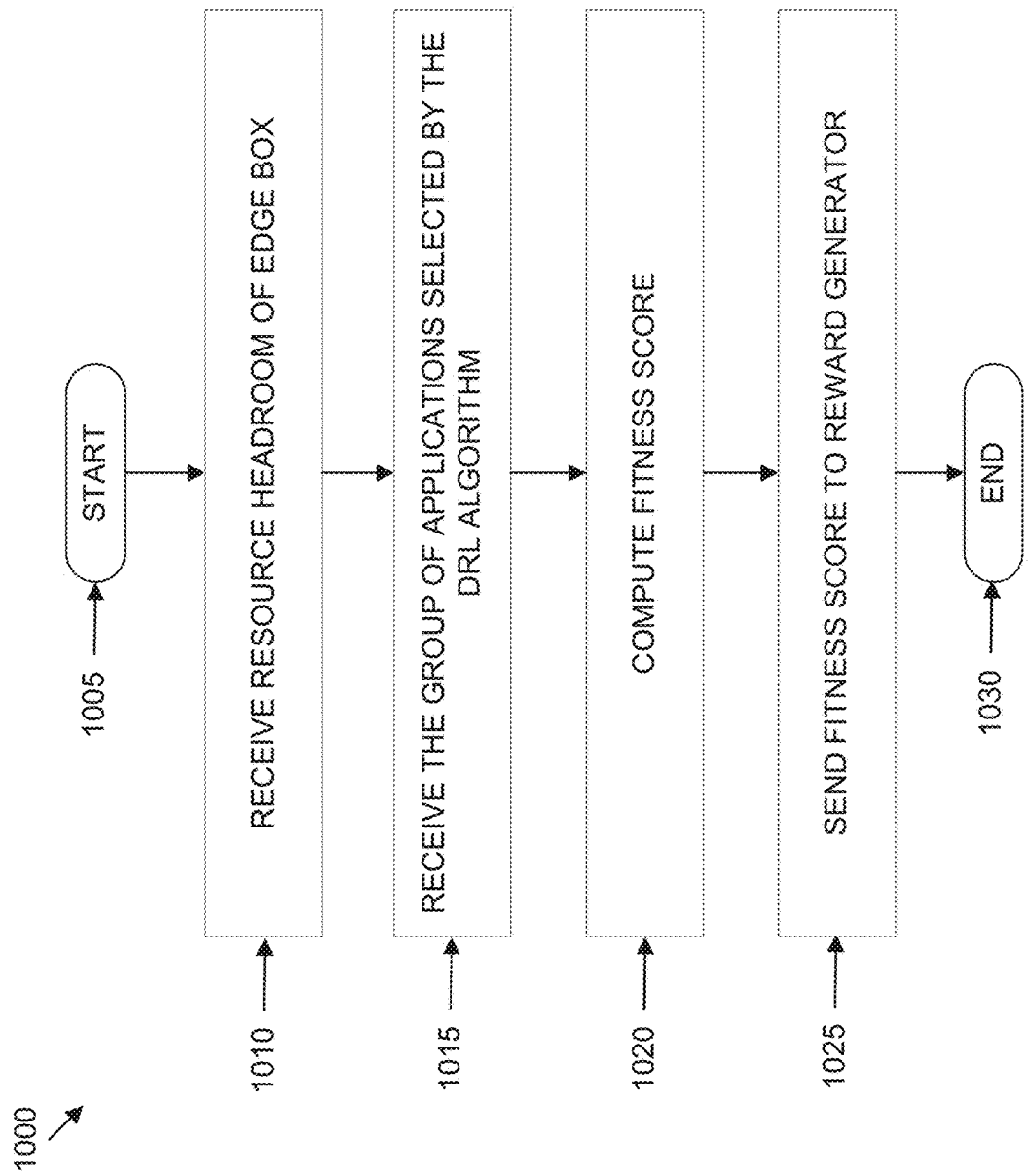
FIG. 10 is an example flowchart outlining operations of a process for generating a fitness score by the DL algorithm of FIGS. 7 and 8, in accordance with some embodiments of the present disclosure.

Turning to FIG. 10, another example flowchart outlining operations of a process 1000 is shown, in accordance with some embodiments of the present disclosure. The process 1000 may include other or additional operations depending upon the embodiment. The process 1000 may be implemented by the DL algorithm 335, and particularly the server 125, to determine a similarity or fitness score. Thus, upon starting at operation 1005, the DL algorithm 335 receives the resource headroom 355 of the edge box 360 at operation 1010. At operation 1015, the DL algorithm 335 also receives the group of applications 330 from the DRL algorithm 315. Based on the inputs of the operations 1010 and 1015, the DL algorithm 335 computes a similarity or fitness score at operation 1020. As discussed above, the DL algorithm 335 may implement a CNN based algorithm or other suitable algorithm to compute the similarity or fitness score. At operation 1025, the DL algorithm 335 sends the similarity or fitness score to the reward generator 345. The process 1000 ends at operation 1030.

Turning to FIG. 11, another example flowchart outlining operations of a process 1100 is shown, in accordance with some embodiments of the present disclosure. The process 1100 may include other or additional operations depending upon the embodiment. The process 1100 may be implemented by the reward generator 345, and particularly the server 125, to determine a reward for the DRL algorithm 315. Thus, upon starting at operation 1105, the reward generator 345 receives the similarity or fitness score from the DL algorithm 335 at operation 1110. At operation 1115, the reward generator 345 computes the reward for the DRL algorithm 315 based on the similarity or fitness score. For a score indicating a high similarity, the reward generator 345 may generate a positive reward and for a score indicating a low similarity, the reward generator may generate a zero or negative reward. In some embodiments, the reward generator 345 may be implemented as a look-up table indicating the reward value for each value of the similarity or fitness score generated by the DL algorithm 335. In other embodiments, the reward generator 345 may implement other mechanisms to generate the reward. At operation 1120, the reward generator 345 sends the reward to the DRL algorithm 315 via the reward signal 340. The process 1100 ends at operation 1125.

Referring to FIG. 12, an example user interface or dashboard 1200 is shown, in accordance with some embodiments of the present disclosure. The dashboard 1200 may be used by a user to monitor the health (e.g., the resource headroom) of the plurality of edge devices 105. The dashboard 1200 may also be used by a user to view the group of applications 330 that are suitable for a particular one of the plurality of edge devices 105 for installation thereon. The dashboard 1200 may also enable a user to select one or more applications from the group of applications 330 for installation on a particular one of the edge boxes 105. For example, the dashboard 1200 shows a list of edge devices 1205 (e.g., the plurality of edge devices 105). The user may select an edge device from the list of edge devices 1205 to view a group of applications 1210 that are suitable for installing on that selected edge device. The user may select one of the group of applications 1210 to install on the selected edge device.

It is to be understood that the features of the dashboard 1200 are only an example, and not intended to be limiting in any way. The shape, size, orientation, positioning, and other features of the dashboard 1200 may vary in other embodiments from that shown. Thus, the dashboard 1200 provides a user interface that facilitates human-computer interaction between the users and the back-end server 125. The dashboard 1200 is configured to receive user inputs from the users via a graphical user interface ("GUI") and transmit those user inputs to the back-end server 125. The dashboard 1200 is also configured to receive outputs/information from the back-end server 125 and present those outputs/information to the users via the GUI. The GUI may present a variety of graphical icons, windows, visual indicators, menus, visual widgets, and other indicia to facilitate user interaction. In other embodiments, the dashboard 1200 may be configured as other types of user interfaces, including for example, text-based user interfaces and other man-machine interfaces. Thus, the dashboard 1200 may be configured in a variety of ways.

Further, the dashboard 1200 may be configured to receive user inputs in a variety of ways. For example, the dashboard 1200 may be configured to receive the user inputs using input technologies including, but not limited to, a keyboard, a stylus and/or touch screen, a mouse, a track ball, a keypad, a microphone, voice recognition, motion recognition, remote controllers, input ports, one or more buttons, dials, joysticks, etc. that allow an external source, such as the user, to enter information. The dashboard 1200 may also be configured to present outputs/information to the users in a variety of ways. For example, the dashboard 1200 may be configured to present information to external systems such as users, memory, printers, speakers, etc. Therefore, although not shown, dashboard 1200 may be associated with a variety of hardware, software, firmware components, or combinations thereof. Generally speaking, the dashboard 1200 may be associated with any type of hardware, software, and/or firmware component that enables the back-end server 125 to perform the functions described herein. Thus, the dashboard receives a user request (e.g., an input) from the user and transmits that user request to the back-end server 125. In response to the user request, the back-end server 125 may perform one or more operations (e.g., install an application on an edge box).

Figure 13:
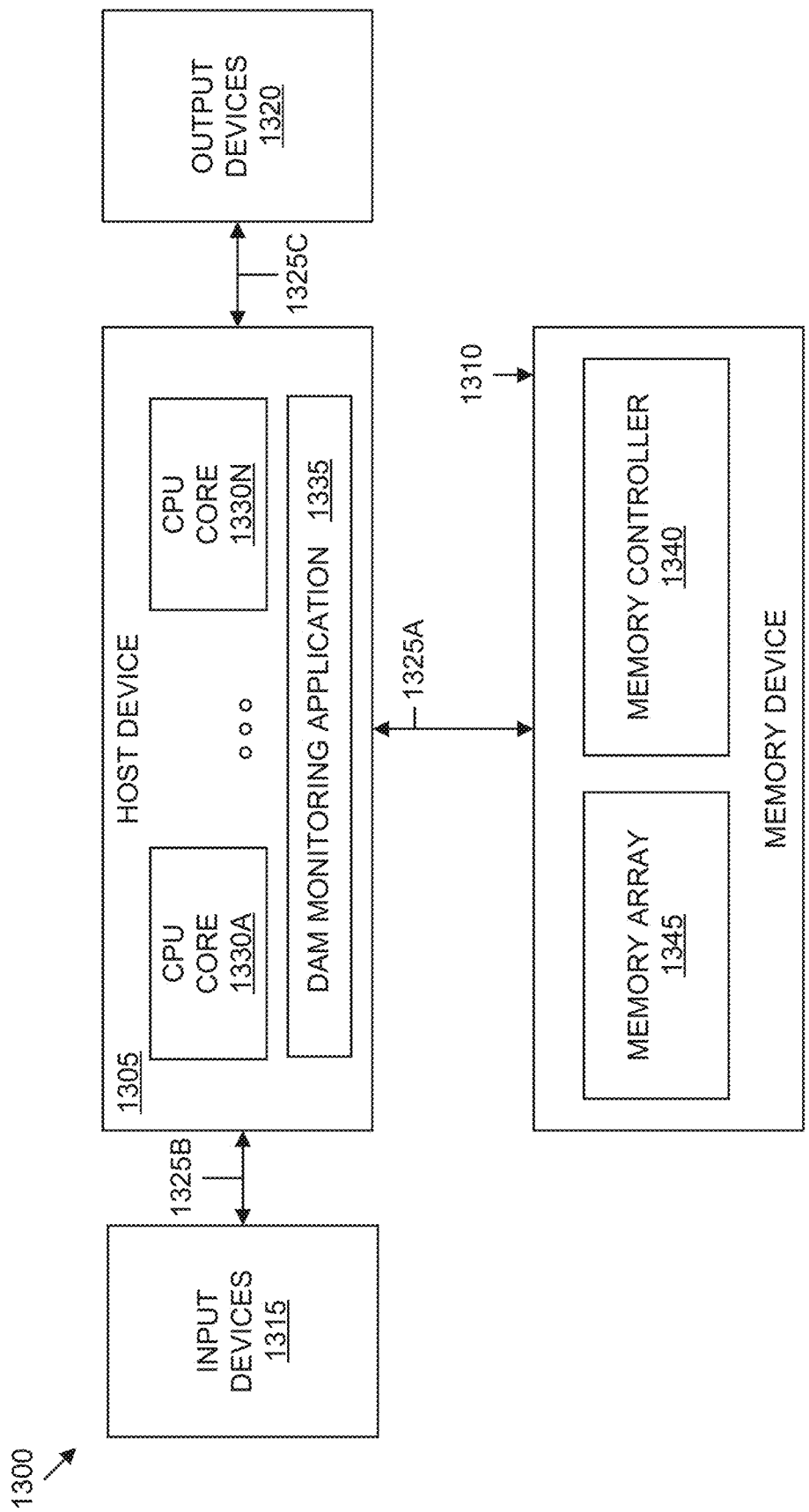
FIG. 13 is an example block diagram of a computing device, in accordance with some embodiments of the present disclosure.

Referring now to FIG. 13, an example block diagram of a computing system 1300 is shown, in accordance with some embodiments of the disclosure. The computing system 1300 may represent an example implementation of the back-end server 125. Thus, the computing system 1300 may be used for performing the functions discussed above in FIGS. 1-12. The computing system 1300 includes a host device 1305 associated with a memory device 1310. The host device 1305 may be configured to receive input from one or more input devices 1315 and provide output to one or more output devices 1320. The host device 1305 may be configured to communicate with the memory device 1310, the input devices 1315, and the output devices 1320 via appropriate interfaces 1325A, 1325B, and 1325C, respectively. The computing system 1300 may be implemented in a variety of computing devices such as computers (e.g., desktop, laptop, servers, data centers, etc.), tablets, personal digital assistants, mobile devices, other handheld or portable devices, or any other computing unit suitable for performing the dam monitoring analysis using the host device 1305.

The input devices 1315 may include any of a variety of input technologies such as a keyboard, stylus, touch screen, mouse, track ball, keypad, microphone, voice recognition, motion recognition, remote controllers, input ports, one or more buttons, dials, joysticks, and any other input peripheral that is associated with the host device 1305 and that allows an external source, such as a user, to enter information (e.g., data) into the host device and send instructions to the host device. Similarly, the output devices 1320 may include a variety of output technologies such as external memories, printers, speakers, displays, microphones, light emitting diodes, headphones, video devices, and any other output peripherals that are configured to receive information (e.g., data) from the host device 105. The "data" that is either input into the host device 1305 and/or output from the host device may include any of a variety of textual data, graphical data, images, combinations thereof, or other types of analog and/or digital data that is suitable for processing using the computing system 1300.

The host device 1305 includes or is associated with one or more processing units/processors, such as Central Processing Unit ("CPU") cores or processors 1330A-1330N. The CPU cores 1330A-1330N may be implemented as an Application Specific Integrated Circuit ("ASIC"), Field Programmable Gate Array ("FPGA"), or any other type of processing unit. Each of the CPU cores 1330A-1330N may be configured to execute instructions for running one or more applications of the host device 1305. In some embodiments, the instructions and data needed to run the one or more applications may be stored within the memory device 1310. The host device 1305 may also be configured to store the results of running the one or more applications within the memory device 1310. Thus, the host device 1305 may be configured to request the memory device 1310 to perform a variety of operations. For example, the host device 1305 may request the memory device 1310 to read data, write data, update or delete data, and/or perform management or other operations.

One such application that the host device 1305 may be configured to run may be a profiling application 1335. The profiling application 1335 may be part of a software suite or package that may be used by a user of the host device 1305 to perform the functions discussed above. In some embodiments, the instructions needed to execute or run the profiling application 1335 may be stored within the memory device 1310. The profiling application 1335 may be executed by one or more of the CPU cores 1330A-1330N using the instructions associated with the profiling application from the memory device 1310. Referring still to FIG. 13, the memory device 1310 includes a memory controller 1340 that is configured to read data from or write data to a memory array 1345. In some embodiments, the memory array 1345 may include a variety of volatile and/or non-volatile memories. For example, in some embodiments, the memory array 1345 may include NAND flash memory cores, NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array. Generally speaking, the memory array 1345 may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, optical drives, cloud memory, or any combination of primary and/or secondary memory that is suitable for performing the operations described herein.

The memories within the memory array 1345 may be individually and independently controlled by the memory controller 1340. In other words, the memory controller 1340 may be configured to communicate with each memory within the memory array 1345 individually and independently. By communicating with the memory array 1345, the memory controller 1340 may be configured to read data from or write data to the memory array in response to instructions received from the host device 1305. Although shown as being part of the memory device 1310, in some embodiments, the memory controller 1340 may be part of the host device 1305 or part of another component of the computing system 1300 and associated with the memory device. The memory controller 1340 may be implemented as a logic circuit in either software, hardware, firmware, or combination thereof to perform the functions described herein. For example, in some embodiments, the memory controller 1340 may be configured to retrieve the instructions associated with the profiling application 1335 stored in the memory array 1345 of the memory device 1310 upon receiving a request from the host device 1305.

It is to be understood that only some components of the computing system 1300 are shown and described in FIG. 13. However, the computing system 1300 may include other components such as various batteries and power sources, networking interfaces, routers, switches, external memory systems, controllers, etc. Generally speaking, the computing system 1300 may include any of a variety of hardware, software, and/or firmware components that are needed or considered desirable in performing the functions described herein. Similarly, the host device 1305, the input devices 1315, the output devices 1320, and the memory device 1310 including the memory controller 1340 and the memory array 1345 may each include other hardware, software, and/or firmware components that are considered necessary or desirable in performing the functions described herein.

Although DDPG is used as an example for the DRL algorithm 315 and CNN is used as an example for the DL algorithm 335, in other embodiments, other suitable techniques and algorithms may be used for each of the DRL algorithm and the DL algorithm. Further, it is to be understood that any examples used above are only for explanation purposes and are not intended to limit the scope of the disclosure in any way.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. A method comprising:
   receiving, by a processor executing computer-readable instructions stored on a memory, a resource headroom data of an edge device;
   receiving, by the processor, resource utilization data of a plurality of applications;
   selecting, by the processor, a group of applications from the plurality of applications for installation on the edge device based upon the resource headroom of the edge device;
   computing, by the processor, a fitness score based upon a suitability of the selected group of applications for the edge device;
   generating, by the processor, a reward based on the fitness score; and
   using, by the processor, the reward to refine the selection of the group of selections in subsequent iterations.

2. The method of claim 1, wherein the processor executes the computer-readable instructions for selecting the group of applications based upon a Deep Reinforcement Learning algorithm.

3. The method of claim 2, wherein the Deep Reinforcement Learning algorithm comprises a Deep Deterministic Policy Gradient algorithm.

4. The method of claim 2, wherein the Deep Reinforcement Learning algorithm comprises an agent that adjusts the selection of the group of applications based on the reward.

5. The method of claim 1, wherein the processor executes the computer-readable instructions for determining the fitness score based on a Deep Learning algorithm.

6. The method of claim 5, wherein the Deep Learning algorithm comprises a Convolutional Neural Network.

7. The method of claim 1, further comprising selecting, by the processor, at least one of the group of applications for installing on the edge device.

8. The method of claim 1, wherein the fitness score comprises a first probability score if the group of applications fit into the resource headroom of the edge device and a second probability score different from the first probability score if the group of applications do not fit into the resource headroom of the edge device.

9. The method of claim 1, wherein the reward comprises a positive value upon the fitness score indicating a high suitability of the selected group of applications for the edge device and a zero or negative value upon the fitness score indicating a low suitability of the selected group of applications for the edge device.

10. The method of claim 1, wherein the resource headroom data is represented as a multi-variate time-series data.

11. The method of claim 1, wherein the resource headroom comprises resource utilization information of at least one of central processing unit utilization, memory capacity, network bandwidth, memory bandwidth, field programmable gate array (FPGA) data for programming new logic, or temperature.

12. The method of claim 1, wherein the edge device comprises an agent to compute the resource headroom data based upon the resource utilization data of the edge device.

13. The method of claim 1, further comprising presenting, by the processor, the group of applications on a dashboard for selection by a user for installation on the edge device.

14. A system comprising:
    a memory having computer-readable instructions stored thereon; and
    a processor that executes the computer-readable instructions to:
      receive a resource headroom data of an edge device;
      receive resource utilization data of a plurality of applications;
      select a group of applications from the plurality of applications for installation on the edge device based upon the resource headroom of the edge device;
      compute a fitness score based upon a suitability of the selected group of applications for the edge device;
      generate a reward based on the fitness score; and
      use the reward to refine the selection of the group of selections in subsequent iterations.

15. The system of claim 14, wherein the processor executes the computer-readable instructions to select the group of applications based upon a Deep Reinforcement Learning algorithm and determine the fitness score based on a Deep Learning algorithm.

16. The system of claim 14, wherein the resource headroom comprises resource utilization information of at least one of central processing unit utilization, memory capacity, network bandwidth, memory bandwidth, field programmable gate array (FPGA) data for programming new logic, or temperature, and wherein the resource headroom data is represented as a multi-variate time-series data.

17. The system of claim 14, wherein the reward comprises a positive value upon the fitness score indicating a high suitability of the selected group of applications for the edge device and a zero or negative value upon the fitness score indicating a low suitability of the selected group of applications for the edge device.

18. A non-transitory computer-readable media comprising computer-readable instructions stored thereon that when executed by a processor cause the processor to perform a process comprising:
    receiving a resource headroom data of an edge device;
    receiving resource utilization data of a plurality of applications;
    selecting a group of applications from the plurality of applications for installation on the edge device based upon the resource headroom of the edge device;
    computing a fitness score based upon a suitability of the selected group of applications for the edge device;

generating a reward based on the fitness score; and using the reward to refine the selection of the group of selections in subsequent iterations.

19. The non-transitory computer-readable media of claim 18, wherein the edge device comprises an agent to compute the resource headroom data based upon the resource utilization data of the edge device.

20. The non-transitory computer-readable media of claim 18, wherein the reward comprises a positive value upon the fitness score indicating a high suitability of the selected group of applications for the edge device and a zero or negative value upon the fitness score indicating a low suitability of the selected group of applications for the edge device.

* * * * *